(12) United States Patent
Hirose

(10) Patent No.: US 10,723,097 B2
(45) Date of Patent: Jul. 28, 2020

(54) LAMINATE, PACKAGE, AND PACKAGED ARTICLE

(71) Applicant: TOPPAN PRINTING CO., LTD., Tokyo (JP)

(72) Inventor: Ryo Hirose, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/451,940

(22) Filed: Jun. 25, 2019

(65) Prior Publication Data
US 2020/0001579 A1    Jan. 2, 2020

(30) Foreign Application Priority Data

Jun. 29, 2018   (JP) .................. 2018-124214

(51) Int. Cl.
| | |
|---|---|
| *B32B 1/02* | (2006.01) |
| *B32B 27/32* | (2006.01) |
| *B32B 27/08* | (2006.01) |
| *B32B 7/12* | (2006.01) |
| *B65D 65/40* | (2006.01) |
| *B32B 1/08* | (2006.01) |

(52) U.S. Cl.
CPC .................. *B32B 1/02* (2013.01); *B32B 1/08* (2013.01); *B32B 7/12* (2013.01); *B32B 27/08* (2013.01); *B32B 27/32* (2013.01); *B32B 27/325* (2013.01); *B32B 27/327* (2013.01); *B65D 65/40* (2013.01); *B32B 2255/10* (2013.01); *B32B 2255/205* (2013.01); *B32B 2323/046* (2013.01); *B32B 2553/00* (2013.01)

(58) Field of Classification Search
CPC .. B32B 1/02; B32B 1/08; B32B 27/32; B32B 27/325; B32B 27/327
See application file for complete search history.

(56) References Cited

U.S. PATENT DOCUMENTS 9,695,306 B2 *   7/2017   Ambroise ............... C08L 23/06

FOREIGN PATENT DOCUMENTS

| JP | 2008-207823 | 9/2008 |
|---|---|---|
| JP | 2012-86876 | 5/2012 |

* cited by examiner

*Primary Examiner* — Walter Aughenbaugh

(57) ABSTRACT

A laminate according to an embodiment includes a base material layer, an adhesive layer provided on the base material layer and having a thickness of 0.1 μm to 1.0 μm, and the first sealant layer provided on the adhesive layer and made of a cyclic polyolefin resin having a glass transition temperature of 60° C. to 85° C. One main surface of the first sealant layer constitutes an outermost surface of the laminate. The other main surface of the first sealant layer is in contact with the adhesive layer or is adjacent to the adhesive layer with only the second sealant layer made of a low density polyethylene resin interposed therebetween. An adhesion strength between the base material layer and the first sealant layer is 0.8 N/15 mm or more.

20 Claims, 2 Drawing Sheets

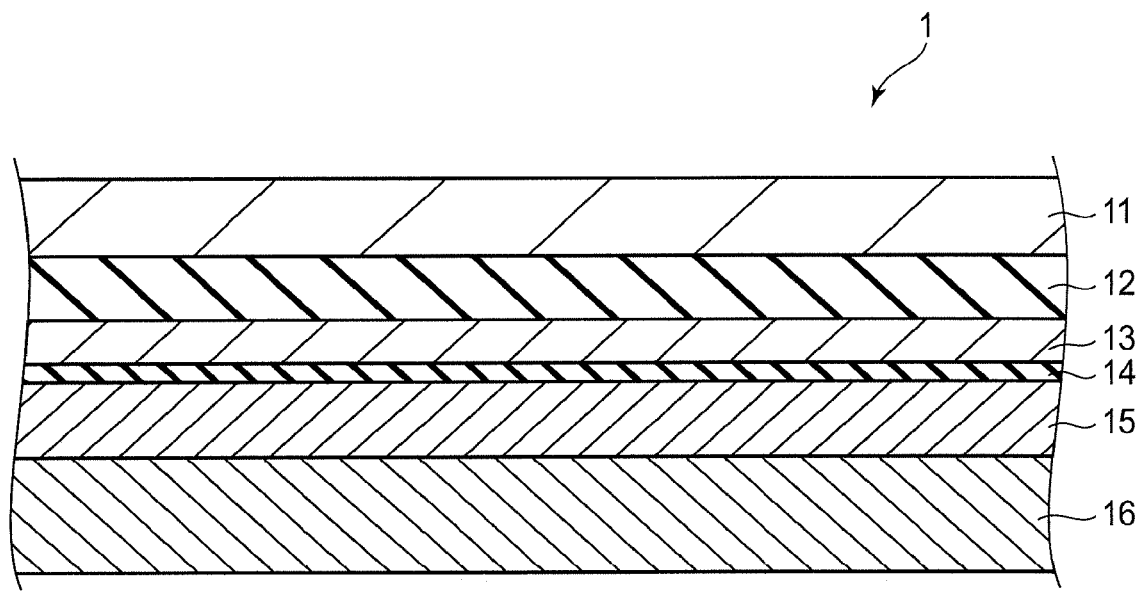
F I G. 1
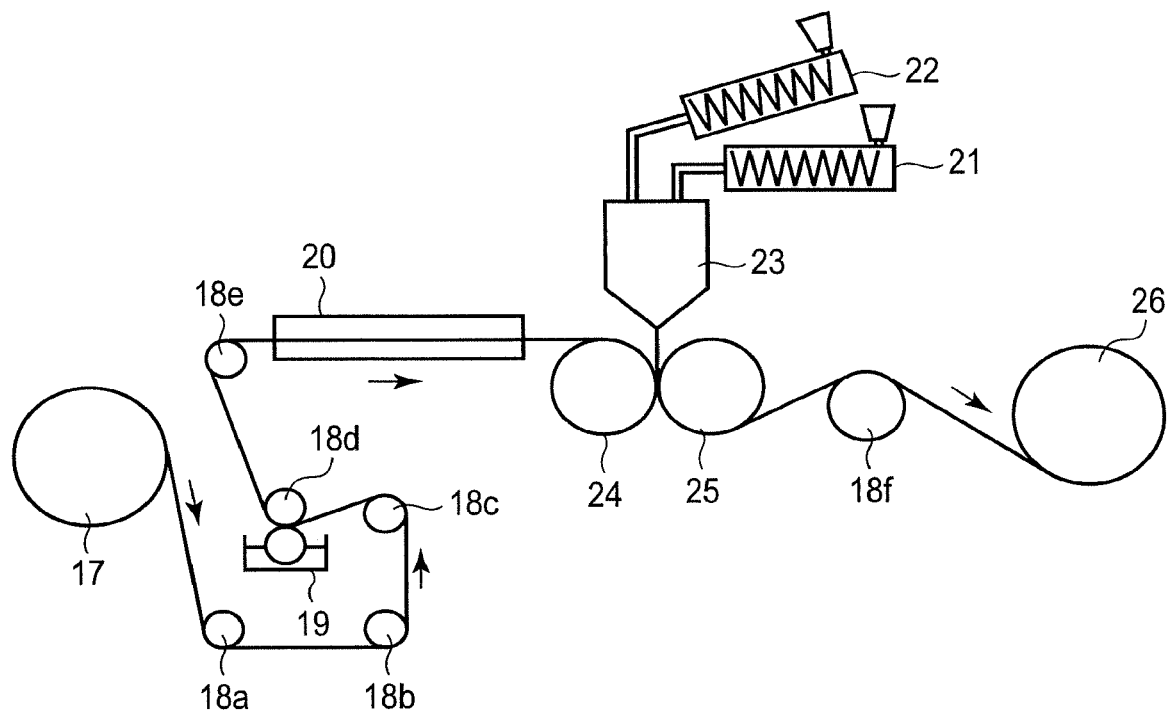
F I G. 2

LAMINATE, PACKAGE, AND PACKAGED ARTICLE

CROSS-REFERENCE TO RELATED APPLICATION

This application is based upon and claims the benefit of priority from Japanese Patent Application No. 2018-124214, filed Jun. 29, 2018, the entire contents of which are incorporated herein by reference.

FIELD

The present invention relates to a laminate, a package, and a packaged article.

BACKGROUND

In a laminate used as a packaging material, etc., a thermoplastic resin is used for the sealant layer. In particular, a polyethylene resin, a polypropylene resin and so on are used as the thermoplastic resin, from the viewpoint of being excellent in lamination processability and heat-sealing property.

However, while these resins can achieve high adhesion strength in heat sealing, they tend to adsorb components contained in foods, medicines, etc. Therefore, a package including a sealant layer made of such a resin so as to be adjacent to a space for containing contents is liable to deteriorate or degrade the contents.

For this reason, polyacrylonitrile resin (PAN), which is a non-adsorbing material, has been used for sealant layers in laminates used for packaging of foods and medicines. However, it is difficult to procure polyacrylonitrile resin films stably, and there is a need to find substitute materials for polyacrylonitrile resins.

Jpn. Pat. Appln. KOKAI Publication No. 2008-207823 describes a packaging bag which has high-speed-filling packaging applicability and has extremely low adsorption of volatile components derived from the contents contained in the bag. This packaging bag is made of a laminate material in which a base material layer, a low density polyethylene resin layer, and a cyclic polyolefin resin composition layer are stacked in this order. In this document, a structure is adopted in which a ratio of the thickness of the low density polyethylene resin layer to the thickness of the cyclic polyolefin resin composition layer is within the range of 20:1 to 2:1.

The invention described in Jpn. Pat. Appln. KOKAI Publication No. 2012-86876 aims to provide a packaging bag and a packaging container each having a sealant layer which is excellent in film-forming property, non-adsorbing property, and heat-sealing property. In order to achieve the above-mentioned object, this document describes that a laminate, which is composed of a base material layer, a linear low density polyethylene resin layer, and a cyclic polyolefin resin composition layer stacked in this order and the cyclic polyolefin resin composition has a predetermined composition, is used for a lid of a packaging bag or a packaging container. This invention uses a linear low density polyethylene resin and a cyclic polyolefin resin composition as the sealant layer.

SUMMARY OF THE INVENTION

An object of the present invention is to provide a laminate which is excellent in non-adsorbing property and adhesion strength between a base material layer and a sealant layer, even though an adhesive layer between the base material layer and the sealant layer is very thin.

According to the first aspect of the present invention, there is provided a laminate comprising a base material layer, an adhesive layer provided on the base material layer and having a thickness within a range of 0.1 μm to 1.0 μm, and the first sealant layer provided on the adhesive layer and made of a cyclic polyolefin resin having a glass transition temperature of 60° C. to 85° C., wherein one main surface of the first sealant layer constitutes an outermost surface of the laminate, the other main surface of the first sealant layer is in contact with the adhesive layer, or is adjacent to the adhesive layer with only the second sealant layer made of a low density polyethylene resin interposed between the first sealant layer and the adhesive layer, and an adhesion strength between the base material layer and the first sealant layer is 0.8 N/15 mm or more.

According to the second aspect of the present invention, there is provided a package comprising the laminate according to the first aspect such that the first layer is adjacent to a space for containing contents.

According to the third aspect of the present invention, there is provided a packaged article comprising the package according to the second aspect, and contents contained in the package.

BRIEF DESCRIPTION OF THE DRAWINGS

FIG. 1 is a cross-sectional view schematically showing a laminate according to the first embodiment of the present invention;

FIG. 2 is a view schematically showing a method for producing the laminate according to the first embodiment of the present invention.

DETAILED DESCRIPTION

Figure 3:
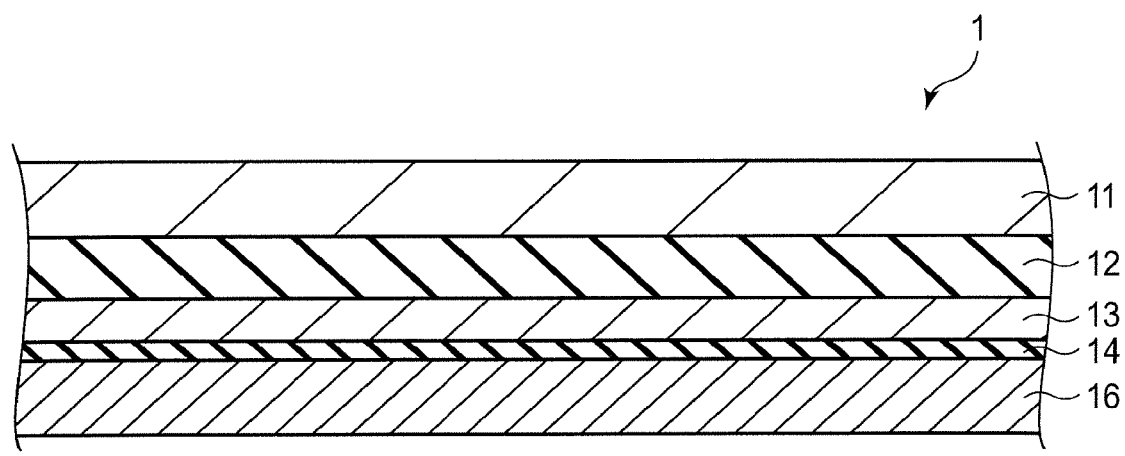
FIG. 3 is a cross-sectional view schematically showing a laminate according to the second embodiment of the present invention.

Hereinafter, the first embodiment of the present invention will be described with reference to the drawings. Elements having the same or a similar function are provided with the same reference sign, and overlapping descriptions thereof are omitted.

FIG. 1 is a cross-sectional view schematically showing a laminate according to the first embodiment of the present invention.

The laminate 1 shown in FIG. 1 is used, for example, as a packaging material. This laminate may also be used for application other than the packaging material, for example, as a cover film which covers a surface of a push button of an electronic device, etc.

The laminate 1 includes a base material layer 11, an adhesive resin layer 12, a barrier layer 13, an adhesive layer 14, the first sealant layer 16, and the second sealant layer 15. In the laminate 1 of the present invention, an adhesive layer may be provided between the base material layer 11 and the adhesive resin layer 12, and between the adhesive resin layer 12 and the barrier layer 13.

The base material layer 11 is, for example, a sheet of paper, a resin film, or a combination thereof. As the resin film, for example, a biaxially oriented polypropylene film, a biaxially oriented polyester film, a biaxially oriented nylon film, or a cellophane film can be used.

A printed layer may be provided on a main surface of the base material layer 11. The printed layer may be provided on one of the main surface of the base material layer 11 on the barrier layer 13 side, may be provided on the back surface thereof, or may be provided on both of them.

The adhesive resin layer 12 is interposed between the base material layer 11 and the barrier layer 13. The adhesive resin layer 12 bonds the base material layer 11 and the barrier layer 13. The adhesive resin layer 12 contains, for example, a polyolefin resin such as low density polyethylene (LDPE) and linear low density polyethylene (LLDPE).

An adhesive layer (not shown) containing an anchor coating agent or an adhesive may be interposed between the base material layer 11 and the adhesive resin layer 12. According to an example, the adhesive layer is obtained by applying an anchor coating agent such as a urethane anchor coating agent onto the main surface of the base material layer 11. According to another example, the adhesive layer is obtained by applying a two-component polyurethane adhesive or the like onto the main surface of the base material layer 11. The adhesive layer bonds the base material layer 11 and the adhesive resin layer 12 further strongly.

It should be noted that the base material layer 11 and the barrier layer 13 may be bonded together by an adhesive to be described later, instead of providing the adhesive resin layer 12.

The barrier layer 13 adheres to one main surface of the base material layer 11 via the adhesive resin layer 12. The barrier layer 13 suppresses the permeation of gases such as water vapor and oxygen through the laminate 1.

The barrier layer 13 is, for example, a layer including an aluminum layer or inorganic oxide thin film. The barrier layer 13 is such as an aluminum foil, an aluminum vapor deposition film, or a transparent vapor deposition film.

The thickness of the aluminum foil is preferably within the range of 5 μm to 15 μm, and more preferably within the range of 5 μm to 9 μm. If the aluminum foil is too thin, handling at the time of bonding it to the base material layer 11 is difficult. If the aluminum foil is excessively thick, it cannot be expected to improve the barrier property accompanied by an increase in thickness, resulting in high cost. Additionally, in this case, the flexibility of the laminate 1 degrades, and it becomes difficult to handle the laminate 1.

An aluminum vapor deposition film is a film in which an aluminum layer is vapor-deposited on a resin film.

The resin film is such as a biaxially oriented polyethylene terephthalate film, a biaxially oriented nylon film, and a biaxially oriented polypropylene film. Although the thickness of the resin film is not particularly limited, it is preferably within the range of 3 μm to 200 μm, and more preferably within the range of 6 μm to 30 μm.

The thickness of the aluminum vapor deposition layer is preferably within the range of 5 nm to 100 nm. If the aluminum vapor deposition layer is too thin, it may not be possible to sufficiently prevent the entry of gases, such as water vapor and oxygen. An excessively thick aluminum vapor deposition layer is not only expensive, but also tends to cause cracks in the deposited layer, which may lead to a degradation in barrier property.

The transparent vapor deposition film is a film in which an inorganic oxide thin film is formed on a resin film by means of a vacuum evaporation method or sputtering method.

As the resin film of the transparent vapor deposition film, the same films as those illustrated for the resin film of the aluminum vapor deposition film can be used.

The inorganic oxide thin film is made of, for example, an inorganic oxide, such as a silicon oxide, an aluminum oxide, and a magnesium oxide. Most inorganic oxide thin film layers are colorless or very faintly colored transparent layers, and thus, the transparent vapor deposition film is suitable when the laminate 1 is required to have transparency. Furthermore, since the inorganic oxide thin film transmits microwaves unlike metal layers, the laminate 1 including the transparent vapor deposition film as the barrier layer 13 can also be used for packaging materials of foodstuffs which are heated with a microwave oven.

The thickness of the inorganic oxide thin film is preferably within the range of 5 nm to 300 nm, and more preferably within the range of 10 nm to 150 nm. If the inorganic oxide thin film is too thin, a uniform coating may not be obtained or the thickness may not be sufficient, and the function as the barrier layer 13 may not be sufficiently fulfilled. If the inorganic oxide thin film is too thick, the inorganic oxide thin film may be cracked when the laminate 1 is bent or applied with tension.

As the transparent vapor deposition film, for example, commercially available products, such as trade name "GL FILM" and "PRIME BARRIER (registered trademark)" (both manufactured by TOPPAN PRINTING CO., LTD.) can be used.

The aluminum vapor deposition layer and the inorganic oxide thin film may be formed on the base material layer 11. The adhesive resin layer 12 and the barrier layer 13 may be omitted when the base material layer 11 contains a resin film.

The adhesive layer 14 is provided on the barrier layer 13 and bonds the barrier layer 13 and the second sealant layer 15. The adhesive layer 14 is made of an adhesive, for example.

The adhesive is such as one or more of a solvent-type adhesive, an aqueous adhesive, a reactive adhesive, and a hot-melt adhesive.

The solvent-type adhesive is an adhesive which uses an organic solvent. The solvent-type adhesive is such as a vinyl acetate-based solvent-type adhesive, a rubber-based solvent-type adhesive, an ether-based solvent-type adhesive, and a polyester-based solvent-type adhesive.

The aqueous adhesive is an adhesive which uses water. The aqueous adhesive is such as a vinyl acetate resin-based aqueous adhesive, a vinyl acetate copolymer resin-based aqueous adhesive, an acrylic resin-based aqueous adhesive, an epoxy resin-based aqueous adhesive, and a nitrile rubber-based aqueous adhesive.

The reactive adhesive is an adhesive which is cured by a chemical reaction. The reactive adhesive is such as an epoxy resin adhesive and a polyurethane adhesive. The polyurethane adhesive may be a one-component polyurethane adhesive or a two-component polyurethane adhesive which is used in the form of a mixture obtained by mixing a base resin having a hydroxy group and a curing agent having an isocyanate group. The polyurethane adhesive is preferably a two-component polyurethane adhesive.

The hot-melt adhesive is an adhesive which is melted by applying heat thereto and thereafter is solidified by cooling. The hot-melt adhesive is such as a polyamide resin adhesive and a polyester adhesive.

The thickness of the adhesive layer 14 is within the range of 0.1 μm to 1.0 μm, preferably within the range of 0.3 μm to 1.0 μm, and more preferably within the range of 0.5 μm to 1.0 μm. It should be noted that the thickness of the adhesive layer 14 is measured after drying the adhesive. If the adhesive layer 14 is excessively thin, a sufficient seal strength may not be achieved. If the adhesive layer 14 is excessively thick, in many applications, it will be overdesigned and disadvantageous in cost. In addition, the adhesive layer 14 tends to cause adsorption.

The first sealant layer 16 is provided on the adhesive layer 14. The first sealant layer 16 imparts heat-sealing property to the laminate 1. One main surface of the first sealant layer 16 constitutes the outermost surface of the laminate 1. Another main surface of the first sealant layer 16 is adjacent to the adhesive layer 14 with only the second sealant layer 15 interposed between the first sealant layer 16 and the adhesive layer 14. According to an example, a film composed of the first sealant layer 16 and the second sealant layer 15 is a two-layered co-extruded film.

The first sealant layer 16 plays a role of improving the non-adsorbing property of the laminate 1 in addition to imparting the heat-sealing property to the laminate 1.

The first sealant layer 16 is made of a cyclic polyolefin resin.

The cyclic polyolefin resin is preferably a ring-opening metathesis polymerization resin product (COP) which is polymerized by subjecting a cyclic olefin to a metathesis ring-opening polymerization reaction, or a copolymer between a cyclic olefin and an α-olefin (chain olefin), i.e., a cyclic olefin copolymer (COC) or a mixture thereof.

As the cyclic olefin, any cyclic hydrocarbon having an unsaturated hydrocarbon and a bicyclo ring can be used. The cyclic olefin is particularly preferably one having a bicyclo [2.2.1]hept-2-ene (norbornene) skeleton.

As a cyclic polyolefin resin obtained from the cyclic olefin having a norbornene skeleton, for example, a ring-opening metathesis polymerization resin product of a norbornene monomer can be used. An example of a commercially available ring-opening metathesis polymerization resin product is "ZEONOR (registered trademark)" manufactured by ZEON CORPORATION. As the cyclic polyolefin resin obtained from the cyclic olefin having a norbornene skeleton, for example, a norbornene cyclic olefin copolymer can also be used. Examples of a commercially available cyclic olefin copolymer product include "APEL (registered trademark)" manufactured by MITSUI CHEMICALS, INC., and "TOPAS (registered trademark)" manufactured by TOPAS ADVANCED POLYMERS GmbH) and sold by POLYPLASTICS CO., LTD.

As the cyclic polyolefin resin, for example, a cyclic olefin copolymer, which is a copolymer obtained by copolymerizing ethylene and norbornene using a metallocene catalyst, can be suitably used. Cyclic olefin copolymers have non-adsorbing property equivalent to that of cyclic olefin polymers and are inexpensively available. As the copolymer obtained by copolymerizing ethylene and norbornene using a metallocene catalyst, it is possible to use a copolymer containing a repeating unit represented by formula (a) and a repeating unit represented by formula (b). An example of a commercially available cyclic polyolefin resin product is "TOPAS (registered trademark)" manufactured by TOPAS ADVANCED POLYMERS GmbH) and sold by POLYPLASTICS CO., LTD.

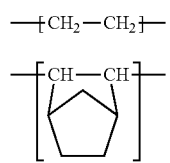

(a)

(b)

The glass transition temperature of the cyclic polyolefin resin is within the range of 60° C. to 85° C. The glass transition temperature of the cyclic polyolefin resin is preferably within the range of 75° C. to 85° C. If the glass transition temperature of the cyclic olefin resin is excessively high, it becomes difficult to achieve high heat seal strength. If the glass transition temperature of the cyclic olefin resin is too low, it becomes difficult to achieve high non-adsorbing property.

With respect to the first sealant layer 16, the size of a polymer free volume Vf obtained by a positron annihilation lifetime measurement method is preferably in the range of 0.100 $nm^3$ or less. The present inventors found a correlation between the polymer free volume obtained by a positron annihilation lifetime measurement method and the non-adsorbing property. If the size of the polymer free volume Vf obtained by the positron annihilation lifetime measurement method exceeds 0.100 $nm^3$, desired non-adsorbing property may not be obtained.

The polymer free volume Vf can be calculated, for example, by a positron annihilation lifetime method.

The positron annihilation lifetime measurement method is a technique in which a time period (in the order of several hundred ps to several tens ns) from the entry of positrons into a sample to the annihilation of the positrons is measured, and information relating to the size of voids (about 0.1 nm to 10 nm) existing in the sample, a number density thereof, and distribution of sizes thereof is evaluated non-destructively from the annihilation lifetime. There is a method of using a radioisotope $^{22}$Na as a radiation source of positrons.

In the method of measuring the annihilation lifetime of polymer, first, a $^{22}$NaCl aqueous solution is enclosed in a 1 cm×1 cm polyimide film to thereby prepare a positron radiation source sample. Next, the polymer is formed into a sheet having a thickness of 0.5 mm to 1 mm, or a plurality of thin film sheets are stacked so as to have total thickness of 0.5 mm to 1 mm, and then a polymer sample of 1 cm×1 cm in size is prepared therefrom. The positron radiation source sample is sandwiched by two polymer samples, thereby obtaining a measurement sample.

The measurement sample is placed in a sample chamber under the condition of room temperature and in vacuum, and a time difference between a γ-radiation start signal at 1.28 MeV, which is generated by radioactive decay of $^{22}$Na as a radiation source, and a γ-radiation stop signal at 511 keV, which is generated by the annihilation of positrons, is measured, and this measurement is repeated several million times or so. A decay curve obtained by a statistical processing in which time (ns) and the number of counts are taken on a horizontal axis and a vertical axis, respectively, includes the first component $\tau_1$ whose gradient of the decay is steep, the second component $\tau_2$ whose gradient of the decay is more gentle, a third component $\tau_3$ whose gradient of the decay is gentle, etc. If the decay curve is subjected to inverse Laplace transform, and then time (ns) is provided on the horizontal axis, and a probability density function is provided on the vertical axis, a lifetime distribution of τ components including $\tau_1$, $\tau_2$, and $\tau_3$, appears as peaks.

The polymer free volume Vf is represented as a volume of a sphere-shaped void having a radius R in the order of several nm formed in amorphous portions of the polymer and has an influence on the lifetime $\tau_3$ of ortho-positronium which is formed by combination of positrons with electrons by means of their mutual coulomb forces.

The relation between the radius R (nm) of the polymer free volume Vf presumed as having a sphere shape and the lifetime $\tau_3$ (ns) of the ortho-positronium is represented by the following Equation (1).

$$\tau_3 = \frac{1}{2}\left[1 - \frac{R}{R+0.166} + \frac{1}{2\pi}\sin\left(2\pi\frac{R}{R+0.166}\right)\right]^{-1} \quad \text{Equation (1)}$$

The radius R (nm) of the sphere-shaped polymer free volume Vf can be calculated from the Equation (1), and the polymer free volume Vf ($nm^3$) can be calculated from the following Equation (2).

$$Vf = 4/3\pi R^3 \quad \text{Equation (2)}$$

The first sealant layer 16 may further contain an additive. The additive is, for example, one or more of a lubricant, an antioxidant, an ultraviolet light absorber, a light stabilizer, an antistatic agent, an anti-blocking agent, a flame retardant, a crosslinking agent, and a colorant. As the lubricant, for example, a higher fatty acid metal salt, aliphatic alcohol, polyglycol, triglyceride, wax, a phenolic compound, or a mixture containing one or more of them, may be favorably used for the purpose of improving the processability. The wax may be a natural substance-derived wax, for example, a mineral wax such as Montan wax, or a synthetic wax such as polyethylene wax.

The proportion of the additive in the total amount of the cyclic polyolefin and the additive is preferably 1.0% by weight or less, and more preferably 5.0% by weight or less.

The thickness of the first sealant layer 16 is preferably 5 μm or more. The thickness of the first sealant layer 16 is preferably within the range of 10 μm to 50 μm, and more preferably within the range of 10 μm to 30 μm. If the first sealant layer 16 is excessively thin, the film formation of the first sealant layer 16 becomes unstable, and the effect of suppressing adsorption may be reduced. If the first sealant layer 16 is excessively thick, the improvement in the adsorption suppressing effect accompanied by an increase in the thickness of the first sealant layer 16 is slight.

The adhesion strength between the first sealant layer 16 and the base material layer 11 is 0.8 N/15 mm or more, preferably 1.0 N/15 mm or more, more preferably 1.7 N/15 mm or more, and further preferably 3.0 N/15 mm or more. If the adhesion strength between the base material layer 11 and the first sealant layer 16 is small, a sufficient seal strength may not be achieved. If the adhesion strength between the base material layer 11 and the first sealant layer 16 is excessively large, in many applications, it will be overdesigned and disadvantageous in cost. The above-mentioned adhesion strength is, for example, 4.0 N/15 mm or less.

The second sealant layer 15 is interposed between the adhesive layer 14 and the first sealant layer 16.

The second sealant layer 15 is made of a low density polyolefin resin. An effect of improving the heat-sealing property of the first sealant layer 16 can be expected by the presence of the second sealant layer 15. Furthermore, the second sealant layer 15 makes it difficult to cause a neck-in phenomenon during the film formation of the first sealant layer 16. In addition, the second sealant layer 15 exhibits favorable adhesion strength relative to the first sealant layer 16.

The low density polyethylene resin is obtained by a known manufacturing method such as a high-pressure method. The low density polyethylene resin is obtained by polymerizing, for example, ethylene obtained by thermal decomposition of naphtha. Examples of commercially available products of the low density polyethylene resin include "LC607K" (MFR at 190° C. and 21.168N: 8.0 g/10 min, and density: 0.919 $g/cm^3$) and "LC520" (MFR at 190° C. and 21.168N: 3.6 g/10 min, and density: 0.923 $g/cm^3$). Both of the resins are manufactured by JAPAN POLYETHYLENE CORPORATION.

The melt flow rate (MFR) of low density polyethylene resin at a temperature of 190° C. and a load of 21.168N (=2.16 kgf) is preferably within the range of 3.6 g/10 min to 13.0 g/10 min, more preferably within the range of 4.0 g/10 min to 13.0 g/10 min, and further preferably within the range of 5 g/10 min to 10.5 g/10 min. The melt flow rate (MFR) referred to herein is a measurement value obtained by a method conforming to JIS K7210:1999. The melt flow rate (MFR) is a measurement value of the weight of resin discharged in 10 min when a load of 2.16 kgf is applied to the resin at 190° C. Hereinafter, the term "melt flow rate (MFR)" means a value obtained by this method.

When the melt flow rate (MFR) of the low density polyethylene resin is largely different from the melt flow rate (MFR) of the cyclic polyolefin resin, there may be a case where the film formation becomes unstable when forming the first sealant layer 16 and the second sealant layer 15 by an extrusion laminating method.

When as the low density polyethylene resin, a low density polyethylene resin whose melt flow rate (MFR) is in the above range is used, physical properties suitable for the extrusion lamination can be obtained, and inconvenience is hardly caused even when high-speed film formation is performed. In this case, a homogeneous layer can be easily formed.

The density of the low density polyethylene resin is preferably within the range of 0.915 $g/cm^3$ to 0.925 $g/cm^3$, and more preferably within the range of 0.915 $g/cm^3$ to 0.922 $g/cm^3$. If the density of the low density polyethylene resin is too low, the film formation of the second sealant layer 15 is highly likely to be unstable. If the density of the low density polyethylene resin is too high, the film formation becomes unstable. The density referred to herein is a measurement value obtained by a method conforming to JIS K7112:1999.

The low density polyethylene resin contained in the second sealant layer 15 differs in the number of carbon atoms of a long-chain branch, which is a side chain branched from the main chain, from a linear low density polyethylene resin. A low density polyethylene resin has a long chain branch with more than about 20 carbon atoms. On the other hand, a linear low density polyethylene resin does not have a long chain branch with more than about 20 carbon atoms. The low density polyethylene resin is superior to linear low density polyethylene resins in that it hardly causes an edge weave phenomenon or a neck-in phenomenon when the layer is formed by an extrusion lamination. Furthermore, the low density polyethylene resin is also superior in tearability to linear low density polyethylene resins.

When the low density polyethylene resin and the cyclic polyolefin resin are laminated using an extrusion lamination, the film formation thereof is favorably performed if the melting point of the low destiny polyethylene resin is within the range of 100° C. to 120° C. The melting point of the low density polyethylene resin is more preferably within the range of 100° C. to 110° C. If the melting point is 120° C. or higher, processing of the layer tends to be difficult due to an edge weave phenomenon and/or a neck-in phenomenon.

The thickness of the second sealant layer 15 is preferably 5 μm or more. Additionally, the thickness of the second sealant layer 15 is preferably within the range of 5 μm to less than 30 μm, and more preferably within the range of 5 μm to 25 μm. If the second sealant layer 15 is excessively thin, the film formation of the second sealant layer 15 becomes unstable. If the second sealant layer 15 is excessively thick, adsorption is liable to occur.

A ratio of the thickness of the first sealant layer 16 to the one of the second sealant layer 15 is preferably within the range of 1:2 to 5:1, and more preferably within the range of 1:1 to 5:1. If the ratio is excessively small, adsorption cannot be sufficiently suppressed. If the ratio is excessively large, the film formation of the second sealant layer 15 may become unstable, or adsorption cannot be suppressed during long-term storage.

The total of the first sealant layer 16 and the thickness of the second sealant layer 15 is preferably within the range of 10 μm to 60 μm, and more preferably within the range of 10 μm to 30 μm. If the total is excessively reduced, a sufficient initial seal strength may not be achieved, or degradation in seal strength during a long-term storage may become remarkable. If the total thickness is excessively increased, in many applications, it will be overdesigned and disadvantageous in cost.

The first sealant layer 15 may further contain an additive. The additive is, for example, one or more of an antioxidant, an ultraviolet light absorber, a light stabilizer, an antistatic agent, an anti-blocking agent, a flame retardant, a crosslinking agent, and a colorant.

The proportion of the additive in the total amount of the low density polyethylene resin and the additive is preferably 1.0% by weight or less, and more preferably 5.0% by weight or less.

It should be noted that the adhesive resin layer 12 and the barrier layer 13 may be omitted. If the adhesive resin layer 12 and the barrier layer 13 are omitted, the adhesive layer 14 is interposed between the base material layer 11 and the second sealant layer 15 to bond the base material layer 11 and the second sealant layer 15.

The laminate 1 described above adopts the above-described configuration for the adhesive layer 14, the first sealant layer 16, and the second sealant layer 15. Therefore, the laminate 1 hardly causes adsorption by the first sealant layer 16, and although the adhesive layer 14 between the base material layer 11 and the first sealant layer 16 is thin, the laminate 1 has high adhesion strength and hardly causes delamination of these layers.

The laminate 1 preferably has excellent tearability. "Being excellent in tearability" means that it can be easily torn by hand, and it can be torn apart linearly when it is to be torn apart.

Hereinafter, an example of a method for producing a laminate according to the first embodiment of the present invention will be described.

FIG. 2 is a view schematically showing a method for producing the laminate according to the first embodiment of the present invention.

In the method shown in FIG. 2, a laminate is produced by a roll-to-roll method.

Specifically, first, the unwind roll 17 unwinds the base material layer 11. The base material layer 11 passes through the guide rolls 18a, 18b, and 18c, and the adhesive application unit 19.

An adhesive is applied to one of the main surfaces of the base material layer 11 by the adhesive application unit 19. The adhesive is, for example, the adhesive described above.

When the adhesive is applied to the main surface of the base material layer 11, the adhesive layer 14 is formed on the base material layer 11. Hereinafter, a laminate including the base material layer 11 and the adhesive layer 14 is referred to as the first laminate.

The first laminate passes through the guide rolls 18d and 18e and is then dried in the drying furnace 20. The drying furnace 20 dries the first laminate.

The dried first laminate is then conveyed between the nip roll 24 and the cooling roll 25 facing each other.

A material of the first sealant layer 16 is supplied to the T-die 23 from the first extrusion unit 21. Furthermore, a material of the second sealant layer 15 is supplied to the T-die 23 from the second extrusion unit 22. The T-die 23 supplies the material of the first sealant layer 16 and the material of the second sealant layer 15 to the gap between the nip roll 24 and the cooling roll 25. By this supply, the first sealant layer 16 and the second sealant layer 15 are formed on the adhesive layer 14.

The laminate to which the material of the first sealant layer 16 and the material of the second sealant layer 15 are supplied is cooled by the cooling roll 25. The laminate 1 is obtained in this way.

The laminate 1 then passes through the guide roll 18f and is wound up by the wind-up roll 26.

Next, another example of the method for producing a laminate according to the first embodiment of the present invention will be described.

First, the base material layer 11 is prepared, and an anchor coating agent is applied to one of the main surfaces thereof to form an adhesive layer.

Next, the raw material of the adhesive resin layer 12 is heated and melted, and the base material layer 11 and the barrier layer 13 are sandwich laminated with the melted raw material interposed therebetween. At this time, the lamination is performed so that the adhesive layer formed on the base material layer 11 is in contact with the adhesive resin layer 12. The base material layer 11 and the barrier layer 13 may be bonded together by dry lamination.

Next, an adhesive is applied onto the barrier layer 13 to form the adhesive layer 14.

Next, the second sealant layer 15 and the first sealant layer 16 are formed on the adhesive layer 14 by extrusion lamination. That is, the raw material of the second sealant layer 15 and the raw material of the first sealant layer 16 are coextruded on the adhesive layer 14 to form the second sealant layer 15 and the first sealant layer 16.

It should be noted that when the adhesive resin layer 12 and the barrier layer 13 are omitted from the laminate 1, the second sealant layer 15 and the first sealant layer 16 are formed on the base material layer 11 by extrusion lamination. Specifically, the second sealant layer 15 and the first sealant layer 16 are formed on the adhesive layer 14 by extrusion lamination.

The laminate 1 is obtained as described above.

According to this method, the laminate 1 can be produced at a lower cost as compared with a method of separately forming a sealant layer provided with the first sealant layer 16 and the second sealant layer 15 and then laminating the same.

Incidentally, if the first sealant layer 16 containing a cyclic polyolefin resin and the second sealant layer 15 containing a low density polyethylene resin are formed by extrusion lamination, the following problems have existed in a trade-off relationship.

When the heat-melting temperature of the resin is high, the cyclic polyolefin resin becomes colored, leading to a defective appearance.

When the heat-melting temperature of the resin is low, the adhesion strength between the first sealant layer and the base material layer is not sufficient.

As a result of an extensive investigation, the present inventors found that a laminate having particularly high adhesion strength and particularly high non-adsorbing property can be obtained without causing appearance defects by setting the thickness of the first sealant layer 16 and the thickness of the second sealant layer 15 within predetermined ranges, and by setting the melt flow rate (MFR) and the density of the low density polyethylene used for the second sealant layer 15 within the predetermined ranges.

The laminate according to the first embodiment of the present invention has been described above.

FIG. 3 is a cross-sectional view schematically showing a laminate according to the second embodiment of the present invention.

The laminate 1 shown in FIG. 3 is the same as the laminate 1 shown in FIG. 1 except that it does not include the second sealant layer 15. Therefore, in the laminate according to the second embodiment, one main surface of the first sealant layer 16 constitutes the outermost surface of the laminate 1, and the other main surface of the first sealant layer 16 is in contact with the adhesive layer 14.

In the laminate according to the second embodiment, the adhesive layer 14 is preferably made of a polyurethane adhesive. The polyurethane adhesive is preferably a two-component polyurethane adhesive. The two-component polyurethane adhesive can realize particularly high adhesion strength by subjecting the first sealant layer 16 to ozone treatment ($O_3$ treatment) when produced.

The laminate according to the second embodiment can be produced by the same method as the production method of a laminate according to the first embodiment except that the second sealant layer 15 is not formed.

As described above, the laminates 1 according to the embodiments of the present invention can be used, for example, as packaging materials. In this case, a package including the packaging material includes the above-described laminate 1 such that the first sealant layer 16 is adjacent to a space for containing the contents. The package may be a bag or a container having a lid. In the latter case, the laminate 1 can be used as at least a part of the lid.

In a packaged article including the package and the contents contained therein, any contents may be employed. According to an example, the contents are medicines such as a patch. Specifically, the contents are a patch containing methyl salicylate, etc. According to another example, the contents are cosmetics or foods. Specifically, the contents are, for example, a skin lotion containing tocopherol acetate.

In this packaged article, the first sealant layer 16 in the laminate 1 hardly permeates medical components, etc., and delamination attributable to permeation of medical components, etc. hardly occurs. Therefore, the performance degradation of the laminate 1 attributable to delamination, etc. hardly occurs, even if the package is stored in a sealed state for a long period of time. Furthermore, since the first sealant layer 16 hardly causes adsorption, components contained in the contents, for example, liquid or paste components hardly adsorb by the first sealant layer 16. That is, this packaged article hardly causes deterioration of contents thereof.

Hereinafter, examples of a laminate according to the present invention will be described.

(1) An embodiment of the present invention is a laminate comprising the first base material layer, the first adhesive layer provided on the first base material and having a thickness within a range of 0.1 µm to 1.0 µm, and the first sealant layer provided on the first adhesive layer and made of a cyclic polyolefin resin having glass transition temperature within a range of 60° C. to 85° C., wherein one main surface of the first sealant layer constitutes an outermost surface of the laminate, and the other surface of the first sealant layer is in contact with the first adhesive layer or is adjacent to the first adhesive layer with only the second sealant layer made of a low density polyethylene resin interposed between the first sealant layer and the first adhesive layer, and the adhesion strength between the first base layer and the first sealant layer is 0.8 N/15 mm or more.

(2) Another embodiment of the present application is the laminate according to the item (1), further comprising the second sealant layer, wherein a ratio of thickness of the second sealant layer to thickness of the first sealant layer is within a range of 1:2 to 5:1, the low density polyethylene resin has a melt flow rate at 190° C. and a load of 21.168 N within a range of 3.6 g/10 min to 13.0 g/10 min, the low density polyethylene resin has a density within a range of 0.915 $g/cm^3$ to 0.925 $g/cm^3$, each of the first and second sealant layers has a thickness of 5 µm or more, and the thickness of the second sealant layer is 25 µm or less.

(3) Another embodiment of the present invention is the laminate according to the item (2), wherein the first base material layer is a biaxially oriented polypropylene film. In this laminate, for example, one surface of the first adhesive layer is in contact with the first base material layer, and the other surface thereof is in contact with the second sealant layer.

(4) Another embodiment of the present invention is the laminate according to the item (2), wherein the first base material layer is a biaxially oriented polyethylene terephthalate film. In this laminate, for example, one surface of the first adhesive layer is in contact with the first base material layer, and the other surface thereof is in contact with the second sealant layer.

(5) Another embodiment of the present invention is the laminate according to the item (2), further comprising a barrier layer interposed between the first base material layer and the second sealant layer, and the second adhesive layer interposed between the first base material layer and the barrier layer, wherein the first base material layer is a biaxially oriented polyethylene terephthalate film, and the barrier layer is an aluminum layer. In this laminate, for example, one surface of the second adhesive layer is in contact with the first base material layer, and the other surface thereof is in contact with the barrier layer. Additionally, one surface of the barrier layer is in contact with the second adhesive layer, and the other surface thereof is in contact with the first adhesive layer. Furthermore, one surface of the first adhesive layer is in contact with the barrier layer, and the other surface thereof is in contact with the second sealant layer.

(6) Another embodiment of the present invention is the laminate according to the item (2), further comprising a barrier layer interposed between the first base material layer and the second sealant layer, the second adhesive layer interposed between the first base material layer and the barrier layer, and an adhesive resin layer interposed between the first base material layer and the second adhesive layer, wherein the first base material layer is a biaxially oriented polyethylene terephthalate film, the adhesive resin layer is a polyethylene layer, and the barrier layer is an aluminum layer. In this laminate, for example, one surface of the adhesive resin layer is in contact with the first base material layer, and the other surface thereof is in contact with the second adhesive layer. In addition, one surface of the second adhesive layer is in contact with the adhesive resin layer, and the other surface thereof is in contact with the barrier layer. Furthermore, one surface of the barrier layer is in contact with the second adhesive layer, and the other surface thereof is in contact with the first adhesive layer. Furthermore, one surface of the first adhesive layer is in contact with the barrier layer, and the other surface thereof is in contact with the second sealant layer.

(7) Another embodiment of the present invention is the laminate according to the item (2), further comprising a barrier layer interposed between the first base material layer and the second sealant layer, and the second adhesive layer interposed between the first base material layer and the barrier layer, wherein the first base material layer is a cellophane film, and the barrier layer is an aluminum layer. In this laminate, for example, one surface of the second adhesive layer is in contact with the first base material layer, and the other surface thereof is in contact with the barrier layer. Additionally, one surface of the barrier layer is in contact with the second adhesive layer, and the other surface thereof is in contact with the first adhesive layer. Furthermore, one surface of the first adhesive layer is in contact with the barrier layer, and the other surface thereof is in contact with the second sealant layer.

(8) Another embodiment of the present invention is the laminate according to the item (2), further comprising a barrier layer interposed between the first base material layer and the second sealant layer, the second adhesive layer interposed between the first base material layer and the barrier layer, and an adhesive resin layer interposed between the first base material layer and the second adhesive layer, wherein the first base material layer is a cellophane film, the adhesive resin layer is a polyethylene layer, and the barrier layer is an aluminum layer. In this laminate, for example, one surface of the adhesive resin layer is in contact with the first base material layer, and the other surface thereof is in contact with the second adhesive layer. Additionally, one surface of the second adhesive layer is in contact with the adhesive resin layer, and the other surface thereof is in contact with the barrier layer. Furthermore, one surface of the barrier layer is in contact with the second adhesive layer, and the other surface thereof is in contact with the first adhesive layer. Furthermore, one surface of the first adhesive layer is in contact with the barrier layer, and the other surface thereof is in contact with the second sealant layer.

(9) Another embodiment of the present invention is the laminate according to the item (2), further comprising a barrier layer interposed between the first base material layer and the second sealant layer, and the second adhesive layer interposed between the first base material layer and the barrier layer, wherein the first base material layer consists of paper, a biaxially oriented polyethylene terephthalate film, and an adhesive interposed between the paper and the biaxially oriented polyethylene terephthalate film, and the barrier layer is an aluminum layer. In this laminate, for example, one surface of the second adhesive layer is in contact with the biaxially oriented polyethylene terephthalate film constituting the first base material layer, and the other surface thereof is in contact with the barrier layer. Additionally, one surface of the barrier layer is in contact with the second adhesive layer, and the other surface thereof is in contact with the first adhesive layer. Furthermore, one surface of the first adhesive layer is in contact with the barrier layer, and the other surface thereof is in contact with the second sealant layer.

(10) Another embodiment of the present invention is the laminate according to the item (2), further comprising a barrier layer interposed between the first base material layer and the second sealant layer, the second adhesive layer interposed between the first base material layer and the barrier layer, and the second base material layer interposed between the barrier layer and the first adhesive layer, wherein the first base material layer is paper, the barrier layer is an aluminum layer, and the second base material layer is a nylon layer. In this laminate, for example, one surface of the second adhesive layer is in contact with the first base material layer, and the other surface thereof is in contact with the barrier layer. Additionally, one surface of the barrier layer is in contact with the second adhesive layer, and the other surface thereof is in contact with the second base material layer. Furthermore, one surface of the second base material layer is in contact with the barrier layer, and the other surface thereof is in contact with the first adhesive layer. Furthermore, one surface of the first adhesive layer is in contact with the second base material layer, and the other surface thereof is in contact with the second sealant layer.

(11) Another embodiment of the present invention is the laminate according to the item (2), further comprising a barrier layer interposed between the first base material layer and the second sealant layer, the second adhesive layer interposed between the first base material layer and the barrier layer, and an adhesive resin layer interposed between the first base material layer and the first adhesive layer, wherein the first base material layer is paper, the barrier layer is an aluminum layer, and the adhesive resin layer is an ethylene-methacrylic acid copolymer layer. In this laminate, for example, one surface of the adhesive resin layer is in contact with the first base material layer, and the other surface thereof is in contact with the second adhesive layer. Additionally, one surface of the second adhesive layer is in contact with the adhesive resin layer, and the other surface thereof is in contact with the barrier layer. Furthermore, one surface of the barrier layer is in contact with the second adhesive layer, and the other surface thereof is in contact with the first adhesive layer. Furthermore, one surface of the first adhesive layer is in contact with the barrier layer, and the other surface thereof is contact with the second sealant layer.

(12) Another embodiment of the present invention is the laminate according to the item (2), further comprising a barrier layer interposed between the first base material layer and the second sealant layer, the second adhesive layer interposed between the first base material layer and the barrier layer, and an adhesive resin layer interposed between the first base material layer and the first adhesive layer, wherein the first base material layer is paper, the barrier layer is an aluminum layer, and the adhesive resin layer is a polyethylene layer. In this laminate, for example, one surface of the adhesive resin layer is in contact with the first base material layer, and the other surface thereof is in contact with the second adhesive layer. Additionally, one surface of the second adhesive layer is in contact with the adhesive resin layer, and the other surface thereof is in contact with the barrier layer. Furthermore, one surface of the barrier layer is in contact with the second adhesive layer, and the other surface thereof is in contact with the first adhesive layer. Furthermore, one surface of the first adhesive layer is in contact with the barrier layer, and the other surface thereof is contact with the second sealant layer.

Hereinafter, other examples of the laminate according to the present invention will be described.

(1) An embodiment of the present invention is a laminate comprising a base material layer, an adhesive layer provided on the base material layer and having a thickness within a range of 0.1 μm to 1.0 μm, and the first sealant layer provided on the adhesive layer and made of a cyclic polyolefin resin having a glass transition temperature within a range of 60° C. to 85° C., wherein one main surface of the first sealant layer constitutes an outermost surface of the laminate, and the other main surface of the first sealant layer is in contact with the adhesive layer or is adjacent to the adhesive layer with only the second sealant layer made of a low density polyethylene resin interposed between the first sealant layer and the adhesive layer, and an adhesion strength between the base material layer and the first sealant layer is 0.8 N/15 mm or more.

(2) Another embodiment of the present invention is the laminate according to the item (1), wherein the other main surface of the first sealant layer is in contact with the adhesive layer, the first sealant layer has a thickness within a range of 10 μm to 40 μm, and the first sealant layer is not oriented.

(3) Another embodiment of the present invention is the laminate according to the item (1) or (2), further comprising a barrier layer between the base material layer and the adhesive layer.

(4) Another embodiment of the present invention is the laminate according to the item (3), wherein the barrier layer includes a layer that includes an aluminum layer or inorganic oxide thin film.

(5) Another embodiment of the present invention is the laminate according to the item (3) or (4), further comprising an adhesive resin layer between the base material layer and the barrier layer.

(6) Another embodiment of the present invention is the laminate according to the item (5), wherein the adhesive resin layer contains polyethylene.

(7) Another embodiment of the present invention is the laminate according to any one of the items (1) to (6), wherein the first sealant layer contains, as a resin, only a cyclic polyolefin resin.

(8) Another embodiment of the present invention is the laminate according to any one of the items (1) to (6), wherein the first sealant layer contains only a cyclic polyolefin resin and a discretional additive.

(9) Another embodiment of the present invention is the laminate according to the item (8), wherein the additive is one or more of a lubricant, an antioxidant, an ultraviolet light absorber, a light stabilizer, an antistatic agent, an antiblocking agent, a flame retardant, a crosslinking agent, and a colorant.

(10) Another embodiment of the present invention is the laminate according to the item (9), wherein the lubricant is a higher fatty acid metal salt, aliphatic alcohol, polyglycol, triglyceride, wax, a phenolic compound, or a mixture containing one or more of them.

(11) Another embodiment of the present invention is the laminate according to any one of the items (1) to (6), wherein the first sealant layer contains only a cyclic polyolefin resin.

(12) Another embodiment of the present invention is the laminate according to any one of the items (1) to (11), wherein the adhesive layer is made of an adhesive, and the adhesive is one or more of a solvent-type adhesive, a water-based adhesive, a reactive adhesive, and a hot-melt adhesive.

(13) Another embodiment of the present invention is the laminate according to any one of the items (1) to (11), wherein the adhesive layer is made of a reactive adhesive, and the reactive adhesive is at least one of an epoxy resin adhesive and a polyurethane adhesive.

(14) Another embodiment of the present invention is the laminate according to the item (13), wherein the reactive adhesive is the polyurethane adhesive, and the polyurethane adhesive is a two-component polyurethane adhesive.

(15) Another embodiment of the present invention is the laminate according to any one of the items (1) to (14), wherein the base material layer is a biaxially oriented polyethylene terephthalate film.

(16) Another embodiment of the present invention is a package including the laminate according to any one of the items (1) to (15) such that the sealant layer is adjacent to a space for containing contents.

(17) Another embodiment of the present invention is a packaged article including the package according to the item (16), and contents contained in the package.

Hereinafter, examples of a method for producing a laminate according to the present invention will be described.

(1) An embodiment of the present invention is a method for producing a laminate, comprising forming, on a base material layer, an adhesive layer having a thickness within a range of 0.1 μm to 1.0 μm, and forming the first sealant layer containing a cyclic polyolefin resin having glass transition temperature within a range of 60° C. to 80° C. by extrusion lamination such that one main surface of the first sealant layer constitutes an outermost surface of the laminate and the other main surface of the first sealant layer is in contact with the adhesive layer, or forming the first sealant layer and the second sealant layer made of a low density polyethylene resin by extrusion lamination such that one main surface of the first sealant layer constitutes an outermost surface of the laminate and the other main surface of the first sealant layer is adjacent to the adhesive layer with only the second sealant layer interposed between the first sealant layer and the adhesive layer, wherein a laminate structure including the adhesive layer and the first sealant layer is formed such that an adhesion strength between the base material layer and the first sealant layer is 0.8 N/15 mm or more.

(2) Another embodiment of the present invention is the method for producing the laminate according to the item (1), wherein a process including the formation of the laminate structure is performed by a roll-to-roll method.

(3) Another embodiment of the present invention is the method for producing a laminate according to the item (1) or (2), wherein the glass transition temperature of the cyclic polyolefin resin is within a range of 75° C. to 85° C.

(4) Another embodiment of the present invention is the method for producing a laminate according to any one of the items (1) to (3), wherein the first sealant layer has a polymer free volume of 0.100 nm$^3$ or less.

(5) Another embodiment of the present invention is the method for producing a laminate according to any one of the items (1) to (4), further comprising forming the first sealant layer and the second sealant layer by extrusion lamination such that one main surface of the first sealant layer constitutes an outermost surface of the laminate, and the other main surface of the first sealant layer is adjacent to the adhesive layer with only the second sealant layer interposed between the first sealant layer and the adhesive layer.

(6) Another embodiment of the present application is the method for producing a laminate according to the item (5), wherein the first and the second sealant layers are formed such that a ratio of a thickness of the second sealant layer to a thickness of the first sealant layer is in a range of 1:2 to 5:1, and the low density polyethylene resin has a melt flow rate at 190° C. and a load of 21.168 N within a range of 3.6 g/10 min to 13.0 g/10 min.

(7) Another embodiment of the present invention is the method for producing a laminate according to the item (5) or (6), wherein the low density polyethylene resin has a melt flow rate at a temperature of 190° C. and a load of 21.168 N within a range of 5.0 g/10 min to 10.5 g/10 min.

(8) Another embodiment of the present invention is the method for producing a laminate according to any one of the items (5) to (7), wherein the low density polyethylene resin has a density within a range of 0.915 g/cm$^3$ to 0.925 g/cm$^3$.

(9) Another embodiment of the present invention is the method for producing a laminate according to any one of the items (5) to (8), wherein a total of a thickness of the second sealant layer and a thickness of the first sealant layer is within a range of 10 μm to 60 μm, and each of the second sealant layer and the first sealant layer respectively has a thickness of 5 μm or more.

(10) Another embodiment of the present invention is the method for producing a laminate according to any one of the items (5) to (9), wherein the second sealant layer has a thickness of 25 μm or less.

(11) Another embodiment of the present invention is the method for producing a laminate according to any one of the items (1) to (10), further comprising forming a barrier layer on the base material layer before forming the adhesive layer on the base material layer.

(12) Another embodiment of the present invention is the method for producing a laminate according to the item (11), wherein the barrier layer includes a layer that includes an aluminum layer or inorganic oxide thin film.

Examples and Comparative Examples will be described below.

Example 1

A laminate including a base material layer, a barrier layer, an adhesive layer, and the first sealant layer was produced by the following method.

First, as the base material layer, a biaxially oriented polyethylene terephthalate film having a thickness of 12 μm was prepared. Specifically, "FE2001" manufactured by FUTAMURA CHEMICAL CO., LTD. was prepared. Furthermore, as the barrier layer, an aluminum foil having a thickness of 9 μm was prepared.

Next, an anchor coating agent was applied to one main surface of the base material layer, followed by sandwich-laminating the base material layer and the barrier layer such that the main surface and the barrier layer faced each other with an adhesive resin layer interposed therebetween. Herein, as a material of the adhesive resin layer, polyethylene (PE) was used, and the thickness thereof was set to 15 μm.

Next, an anchor coating agent was applied to a surface of the barrier layer to form an adhesive layer so as to have a thickness of 0.5 μm.

Next, the first sealant layer was formed on the adhesive layer. Specifically, a layer made of a COC resin was formed on the adhesive layer by an extrusion lamination. Also, in the extrusion lamination, O$_3$ treatment was performed before the lamination.

As a material of the first sealant layer, "TOPAS" manufactured by TOPAS ADVANCED POLYMERS GmbH and sold by POLYPLASTICS CO., LTD. was used. This resin was found to have a melt flow rate (MFR) at a temperature of 190° C. and a load of 21.168 N (=2.16 kgf) of 1.8 g/10 min, a density of 1.01 g/cm3, and a glass transition temperature of 78° C. In addition, a polymer sheet made of only the first sealant layer was produced, and the size of a polymer free volume Vf obtained by a positron annihilation lifetime measurement method was calculated. The result was 0.092 nm$^3$.

The thickness of the first sealant layer was set to 30 μm.

A laminate was obtained in the above-described manner.

Example 2

A laminate was produced in the same manner as in Example 1 except that the thickness of the adhesive layer was set to 0.2 μm.

Example 3

A laminate was produced in the same manner as in Example 1 except that the thickness of the adhesive layer was set to 0.9 μm.

Example 4

A laminate was produced in the same manner as in Example 1 except that as a material of the first sealant layer, "TOPAS", which is a COC resin, manufactured by TOPAS ADVANCED POLYMERS GmbH and sold by POLYPLASTICS CO., LTD. was used. The glass transition temperature of this resin is 65° C. In addition, a polymer sheet made of only the first sealant layer was produced, and the size of a polymer free volume Vf obtained by the positron annihilation lifetime measurement method was calculated. The result was 0.093 nm$^3$.

Example 5

A laminate including a base material layer, a barrier layer, an adhesive layer, and the first and the second sealant layers was produced by the following method.

First, the same base material layer as that used in Example 1 and the same barrier layer as that used in Example 1 were prepared.

Next, an anchor coating agent was applied to one main surface of the base material layer, followed by sandwich-laminating the base material layer and the barrier layer such that the main surface and the barrier layer faced each other with an adhesive resin layer interposed therebetween. Herein, as a material of the adhesive resin layer, polyethylene was used, and the thickness thereof was set to 15 μm.

Next, a polyurethane adhesive was applied to a surface of the barrier layer to form an adhesive layer so as to have a thickness of 0.5 μm.

Next, the first and the second sealant layers were formed on the adhesive layer. Specifically, the second sealant layer made of a low density polyethylene resin and the first sealant layer made of a cyclic olefin copolymer (COC) resin to be provided on the second sealant layer were formed on the adhesive layer by an extrusion lamination.

As a material of the first sealant layer, the same resin as that used for the first sealant layer in Example 1 was used.

As a material of the second sealant layer, a low density polyethylene (LDPE) resin was used. This resin was found to have a melt flow rate (MFR) at a temperature of 190° C. and a load of 21.168 N (=2.16 kgf) of 7.0 g/10 min, a density of 0.918 g/cm$^3$, and a melting point of 106° C.

The thicknesses of the first sealant layer and the second sealant layer were set to 20 μm and 10 μm, respectively. That is, a ratio of the thickness of the first sealant layer to the thickness of the second sealant layer was set to 2:1, and a total of the thickness of the first sealant layer and the thickness of the second sealant layer was set to 30 μm.

A laminate was obtained in the above-described manner.

Comparative Example 1

A laminate including a base material layer, a barrier layer, an adhesive layer, and the first sealant layer was produced by the following method.

First, the same base material layer as that used in Example 1 and the same barrier layer as that used in Example 1 were prepared.

Next, a dry-laminating adhesive was applied to one main surface of the base material layer to bond the base material layer and the barrier layer.

Next, a dry-laminating adhesive was applied to a surface of the barrier layer to form an adhesive layer so as to have a thickness of 2.5 μm.

Next, the first sealant layer was laminated on the adhesive layer.

As the first sealant layer, "TOPAS" manufactured by TOPAS ADVANCED POLYMERS GmbH and sold by POLYPLASTICS CO., LTD. was used. This resin is made of a COC resin having a melt flow rate (MFR) at a temperature of 190° C. and a load of 21.168 N (=2.16 kgf) of 1.8 g/10 min, a density of 1.01 g/cm$^3$, and a glass transition temperature of 78° C. In addition, for the first sealant layer, the size of a polymer free volume Vf obtained by the positron annihilation lifetime measurement method was calculated. The result was 0.092 nm$^3$.

The thickness of the first sealant layer was set to 30 μm.

A laminate was obtained in the above-described manner.

Comparative Example 2

A laminate was produced in the same manner as in Comparative Example 1 except that the thickness of the adhesive layer was set to 0.5 μm.

Comparative Example 3

A laminate was produced in the same manner as in Example 1 except that as a material of the first sealant layer, a COC resin having glass transition temperature of 110° C. was used. In addition, a polymer sheet made of only the first sealant layer was produced, and the size of a polymer free volume Vf obtained by the positron annihilation lifetime measurement method was calculated. The result was 0.090 nm$^3$.

Comparative Example 4

A laminate was produced in the same manner as in Example 1 except that as a material of the first sealant layer, low density polyethylene was used instead of the COC resin. In addition, a polymer sheet made of only the first sealant layer was produced, and the size of a polymer free volume Vf obtained by the positron annihilation lifetime measurement method was calculated. The result was 0.155 nm$^3$.

Comparative Example 5

A laminate was produced in the same manner as in Comparative Example 1 except that as a material of the first sealant layer, a polyacrylonitrile resin (PAN) was used instead of the COC resin. The adhesive layer was formed so as to have a thickness of 0.5 μm. In addition, a polymer sheet made of only the first sealant layer was produced, and the size of a polymer free volume Vf obtained by the positron annihilation lifetime measurement method was calculated. The result was 0.085 nm$^3$.

Comparative Example 6

A laminate was produced in the same manner as in Comparative Example 1 except that as the first sealant layer, a film made of a polyacrylonitrile resin (PAN) was used. The adhesive layer was formed so as to have a thickness of 2.5 μm. The size of a polymer free volume Vf of this film obtained by the positron annihilation lifetime measurement method was calculated. The result was 0.085 nm$^3$.

Comparative Example 7

A laminate was produced in the same manner as in Comparative Example 1 except that as a material of the first sealant layer, an ethylene-vinyl alcohol copolymer resin (EVOH resin) was used instead of the COC resin. As the EVOH resin, a resin was used in which the proportion of the number of moles of ethylene in the total number of moles of ethylene and vinyl alcohol contained in the EVOH resin is 44 mol %. The adhesive layer was formed so as to have a thickness of 0.5 μm. In addition, a polymer sheet made of only the first sealant layer was produced, and the size of a polymer free volume Vf by the positron annihilation lifetime measurement method was calculated. The result was 0.065 nm$^3$.

Comparative Example 8

A laminate was produced in the same manner as in Comparative Example 1 except that as the first sealant layer, a film made of an ethylene-vinyl alcohol copolymer resin (EVOH resin) was used. The proportion of the number of moles of ethylene in the total number of moles of ethylene and vinyl alcohol contained in the EVOH resin was found to be 44 mol %. The adhesive layer was formed so as to have a thickness of 2.5 μm. The size of a polymer free volume Vf of this film obtained by the positron annihilation lifetime measurement method was calculated. The result was 0.065 nm$^3$.

Comparative Example 9

A laminate was produced in the same manner as in Comparative Example 1 except that as a material of the first sealant layer, amorphous polyethylene terephthalate (PET) was used instead of the COC resin. As the amorphous polyethylene terephthalate, PET-G, which is obtained by condensation polymerization among terephthalic acid, ethylene glycol and cyclohexane dimethanol, was used. The adhesive layer was formed so as to have a thickness of 0.5 μm. In addition, a polymer sheet made of only the first sealant layer was produced, and the size of a polymer free volume Vf by the positron annihilation lifetime measurement method was calculated. The result was 0.079 nm$^3$.

Comparative Example 10

A laminate was produced in the same manner as in Comparative Example 1 except that as the first sealant layer, a film made of amorphous polyethylene terephthalate (PET) was used. As the film made of amorphous polyethylene terephthalate, a film containing PET-G, which is obtained by condensation polymerization among terephthalic acid, ethylene glycol and cyclohexane dimethanol, was used. The size of a polymer free volume Vf of this film obtained by the positron annihilation lifetime measurement method was calculated. The result was 0.079 nm$^3$. The adhesive layer was formed so as to have a thickness of 2.5 μm.

Example 6

A laminate including a base material layer, a barrier layer, an adhesive layer, and the first and the second sealant layers was produced by the following method.

First, as the base material layer, a biaxially oriented polyethylene terephthalate film having a thickness of 12 μm was prepared. Specifically, "FE2001" manufactured by FUTAMURA CHEMICAL CO., LTD. was prepared. Furthermore, as the barrier layer, an aluminum foil having a thickness of 7 μm was prepared.

Next, an anchor coating agent was applied to one main surface of the base material layer, followed by sandwich-laminating the base material layer and the barrier layer such that the main surface and the barrier layer faced each other with an adhesive resin layer interposed therebetween. Herein, as a material of the adhesive resin layer, polyethylene was used, and the thickness thereof was set to 15 μm.

Next, a polyurethane adhesive was applied to a surface of the barrier layer to form an adhesive layer so as to have a thickness of 0.5 μm.

Next, the first and the second sealant layers were formed on the adhesive layer. Specifically, the second sealant layer made of a low density polyethylene resin and the first sealant layer made of a cyclic polyolefin resin to be provided on the second sealant layer were formed on the adhesive layer by extrusion lamination.

As a material of the first sealant layer, "TOPAS (registered trademark)" manufactured by TOPAS ADVANCED POLYMERS GmbH and sold by POLYPLASTICS CO., LTD. was used. This resin was found to have a melt flow rate at 190° C. and a load of 21.168 N (=2.16 kgf) of 1.8 g/10 min, a density of 1.01 g/cm$^3$, and glass transition temperature of 78° C. In addition, a polymer sheet made of only the first sealant layer was produced, and the size of a polymer free volume Vf by the positron annihilation lifetime measurement method was calculated. The result was 0.092 nm$^3$.

As a material of the second sealant layer, a low density polyethylene resin was used. This resin was found to have a melt flow rate at 190° C. and a load of 21.168 N (=2.16 kgf) of 7.0 g/10 min, a density of 0.918 g/cm$^3$, and a melting point of 106° C.

The thicknesses of the first sealant layer and the second sealant layer were set to 20 μm and 10 μm, respectively. That is, a ratio of the thickness of the first sealant layer to the thickness of the second sealant layer was set to 2:1, and a total of the thickness of the first sealant layer and the thickness of the second sealant layer was set to 30 μm.

A laminate was obtained in the above-described manner.

Example 7

A laminate was produced in the same manner as in Example 6 except that the thicknesses of the first sealant layer and the second sealant layer were set to 25 μm and 5 μm, respectively. That is, in this Example, a ratio of the thickness of the first sealant layer to the thickness of the second sealant layer was set to 5:1.

Example 8

A laminate was produced in the same manner as in Example 6 except that the thicknesses of the first sealant layer and the second sealant layer were set to 10 μm and 20 μm, respectively. That is, in this Example, a ratio of the thickness of the first sealant layer to the thickness of the second sealant layer was set to 1:2.

Example 9

A laminate was produced in the same manner as in Example 6 except that the thicknesses of the first sealant layer and the second sealant layer were set to 15 μm and 10 μm, respectively. That is, in this Example, a ratio of the thickness of the first sealant layer to the thickness of the second sealant layer was set to 1.5:1.

Example 10

A laminate was produced in the same manner as in Example 6 except that the thicknesses of the first sealant layer and the second sealant layer were set to 10 μm and 15 μm, respectively. That is, in this Example, a ratio of the thickness of the first sealant layer to the thickness of the second sealant layer was set to 1:1.5.

Example 11

A laminate was produced in the same manner as in Example 6 except that the thicknesses of the first sealant layer and the second sealant layer were set to 15 μm and 15 μm, respectively. That is, in this Example, a ratio of the thickness of the first sealant layer to the thickness of the second sealant layer was set to 1:1.

Example 12

A laminate was produced in the same manner as in Example 6 except that the thicknesses of the first sealant layer and the second sealant layer were set to 20 μm and 5 μm, respectively. That is, in this Example, a ratio of the thickness of the first sealant layer to the thickness of the second sealant layer was set to 4:1.

Example 13

A laminate was produced in the same manner as in Example 6 except that the thicknesses of the first sealant layer and the second sealant layer were set to 15 μm and 5 μm, respectively. That is, in this Example, a ratio of the thickness of the first sealant layer to the thickness of the second sealant layer was set to 3:1.

Example 14

A laminate was produced in the same manner as in Example 6 except that the thicknesses of the first sealant layer and the second sealant layer were set to 20 μm and 30 μm, respectively. That is, in this Example, a ratio of the thickness of the first sealant layer to the thickness of the second sealant layer was set to 1:1.5.

Example 15

A laminate was produced in the same manner as in Example 6 except that the thicknesses of the first sealant layer and the second sealant layer were set to 20 µm and 25 µm, respectively. That is, in this Example, a ratio of the thickness of the first sealant layer to the thickness of the second sealant layer was set to 1:1.25.

Example 16

A laminate was produced in the same manner as in Example 6 except that as a raw material of the second sealant layer, low density polyethylene (LDPE) having a melt flow rate (MFR) at 190° C. and a load of 21.168 N (=2.16 kgf) of 3.6 g/10 min, a density of 0.923 g/cm$^3$, and a melting point of 111° C. was used instead of using the low density polyethylene (LDPE) used in Example 6.

Example 17

A laminate was produced in the same manner as in Example 6 except that as a raw material of the second sealant layer, low density polyethylene (LDPE) having a melt flow rate (MFR) at 190° C. and a load of 21.168 N (=2.16 kgf) of 8.0 g/10 min, a density of 0.919 g/cm$^3$, and a melting point of 107° C. was used instead of using the low density polyethylene (LDPE) used in Example 6.

Example 18

A laminate was produced in the same manner as in Example 6 except that as a raw material of the second sealant layer, low density polyethylene (LDPE) having a melt flow rate (MFR) at 190° C. and a load of 21.168 N (=2.16 kgf) of 8.4 g/10 min was used instead of using the low density polyethylene (LDPE) used in Example 6.

Example 19

A laminate was produced in the same manner as in Example 6 except that as a raw material of the second sealant layer, low density polyethylene (LDPE) having a melt flow rate (MFR) at 190° C. and a load of 21.168 N (=2.16 kgf) of 4.0 g/10 min, a density of 0.923 g/cm$^3$, and a melting point of 111° C. was used instead of using the low density polyethylene (LDPE) used in Example 6.

Example 20

A laminate was produced in the same manner as in Example 6 except that as a raw material of the second sealant layer, low density polyethylene (LDPE) having a melt flow rate (MFR) at 190° C. and a load of 21.168 N (=2.16 kgf) of 5.0 g/10 min, a density of 0.922 g/cm$^3$, and a melting point of 109° C. was used instead of using the low density polyethylene (LDPE) used in Example 6.

Example 21

A laminate was produced in the same manner as in Example 6 except that as a raw material of the second sealant layer, low density polyethylene (LDPE) having a melt flow rate (MFR) at 190° C. and a load of 21.168 N (=2.16 kgf) of 10.5 g/10 min and a melting point of 107° C. was used instead of using the low density polyethylene (LDPE) used in Example 6.

Example 22

A laminate was produced in the same manner as in Example 6 except that as a raw material of the second sealant layer, low density polyethylene (LDPE) having a melt flow rate (MFR) at 190° C. and a load of 21.168 N (=2.16 kgf) of 13.0 g/10 min, a density of 0.919 g/cm$^3$, and a melting point of 107° C. was used instead of using the low density polyethylene (LDPE) used in Example 6.

Comparative Example 11

A laminate was produced in the same manner as in Example 6 except that as a raw material of the second sealant layer, linear low-density polyethylene (LLDPE) was used instead of using low density polyethylene (LDPE). This resin was found to have a melt flow rate (MFR) at 190° C. and a load of 21.168 N (=2.16 kgf) of 9.0 g/10 min, a density of 0.912 g/cm$^3$, and a melting point of 120° C.

Comparative Example 12

A laminate was produced in the same manner as in Example 6 except that as a raw material of the second sealant layer, linear low-density polyethylene (LLDPE) was used instead of using low density polyethylene (LDPE). This resin was found to have a melt flow rate (MFR) at 190° C. and a load of 21.168 N (=2.16 kgf) of 3.8 g/10 min, a density of 0.903 g/cm$^3$, and a melting point of 98° C.

Example 23

A laminate including a base material layer, a barrier layer, an adhesive layer, and the first sealant layer was produced by the following method.

First, as the base material layer, a biaxially oriented polyethylene terephthalate film (PET) having a thickness of 12 µm was prepared. Specifically, "FE2001" manufactured by FUTAMURA CHEMICAL CO., LTD. was prepared. Furthermore, as the barrier layer, an aluminum (Al) foil having a thickness of 7 µm was prepared.

Next, a two-component polyurethane adhesive was applied to one main surface of the base material layer, followed by sandwich-laminating the base material layer and the barrier layer such that the main surface and the barrier layer faced each other with an adhesive resin layer interposed therebetween. Herein, as a material of the adhesive resin layer, polyethylene (PE) was used, and the thickness thereof was set to 15 µm.

Next, a two-component polyurethane adhesive (anchor coating agent A) was applied to a surface of the barrier layer to form an adhesive layer so as to have a thickness of 0.5 µm.

Next, the first sealant layer was formed on the adhesive layer. Specifically, a non-oriented COC resin layer was formed on the adhesive layer by extrusion lamination. Also, in the extrusion lamination, O$_3$ treatment was performed before the lamination.

As a material of the first sealant layer, the same COC resin as that used in Example 6 was used.

The thickness of the first sealant layer was set to 30 µm.

A laminate was obtained in the above-described manner.

Example 24

A laminate was produced in the same manner as in Example 23 except that an adhesive layer was formed using a two-component polyurethane adhesive (anchor coating agent B).

Example 25

A laminate was produced in the same manner as in Example 23 except that an adhesive layer was formed using a polyolefin adhesive (anchor coating agent C).

Example 26

A laminate was produced in the same manner as in Example 23 except that an adhesive layer was formed using a polyolefin adhesive (anchor coating agent C), and the $O_3$ treatment was not performed in the extrusion lamination.

Example 27

A laminate was produced in the same manner as in Example 23 except that the thicknesses of the first sealant layer was set to 40 μm.

Example 28

A laminate was produced in the same manner as in Example 23 except that the thicknesses of the first sealant layer was set to 10 μm.

Example 29

A laminate was produced in the same manner as in Example 23 except that the thicknesses of the adhesive layer and the first sealant layer were set to 0.1 μm and 40 μm, respectively.

Example 30

A laminate was produced in the same manner as in Example 23 except that the thicknesses of the adhesive layer and the first sealant layer were set to 0.1 μm and 30 μm, respectively.

Example 31

A laminate was produced in the same manner as in Example 23 except that the thicknesses of the adhesive layer and the first sealant layer were set to 0.1 μm and 10 μm, respectively.

Example 32

A laminate was produced in the same manner as in Example 23 except that the thicknesses of the adhesive layer and the first sealant layer were set to 1.0 μm and 40 μm, respectively.

Example 33

A laminate was produced in the same manner as in Example 23 except that the thicknesses of the adhesive layer and the first sealant layer were set to 1.0 μm and 30 μm, respectively.

Example 34

A laminate was produced in the same manner as in Example 23 except that the thicknesses of the adhesive layer and the first sealant layer were set to 1.0 μm and 10 μm, respectively.

Example 35

A laminate was produced in the same manner as in Example 23 except that the two-component polyurethane adhesive was not applied to the base layer, and neither an adhesive resin layer nor a barrier layer was provided.

Information on the produced laminates are summarized in Tables 1, 2, and 3.

TABLE 1

| | First sealant layer | | | | Second sealant layer | | | | Thickness of adhesive layer [μm] | Production method | Ratio between sealant layers | Total thickness of sealant layers [μm] |
|---|---|---|---|---|---|---|---|---|---|---|---|---|
| | Thickness [μm] | Type | Tg [°C.] | Free volume [nm³] | Thickness [μm] | Type | Density [g/cm³] | MFR [g/10 min] | Melting point [°C.] | | | | |
| EX. 1 | 30 | COC | 78 | 0.092 | 0 | — | — | — | — | 0.5 | Extrusion lamination | — | 30 |
| EX. 2 | 30 | COC | 78 | 0.092 | 0 | — | — | — | — | 0.2 | Extrusion lamination | — | 30 |
| Ex. 3 | 30 | COC | 78 | 0.092 | 0 | — | — | — | — | 0.9 | Extrusion lamination | — | 30 |
| Ex. 4 | 30 | COC | 65 | 0.093 | 0 | — | — | — | — | 0.5 | Extrusion lamination | — | 30 |
| Ex. 5 | 20 | COC | 78 | 0.092 | 10 | LDPE | 0.918 | 7.0 | 106 | 0.5 | Extrusion lamination | 2:1 | 30 |
| Comp. ex. 1 | 30 | COC | 78 | 0.092 | 0 | — | — | — | — | 2.5 | Extrusion lamination | — | 30 |
| Comp. ex. 2 | 30 | COC | 78 | 0.092 | 0 | — | — | — | — | 0.5 | Extrusion lamination | — | 30 |
| Comp. ex. 3 | 30 | COC | 110 | 0.090 | 0 | — | — | — | — | 0.5 | Extrusion lamination | — | 30 |
| Comp. ex. 4 | 30 | LDPE | — | 0.155 | 0 | — | — | — | — | 0.5 | Extrusion lamination | — | 30 |
| Comp. ex. 5 | 30 | PAN | — | 0.085 | 0 | — | — | — | — | 0.5 | Dry lamination | — | 30 |
| Comp. ex. 6 | 30 | PAN | — | 0.085 | 0 | — | — | — | — | 2.5 | Dry lamination | — | 30 |
| Comp. ex. 7 | 30 | EVOH | — | 0.065 | 0 | — | — | — | — | 0.5 | Dry lamination | — | 30 |
| Comp. ex. 8 | 30 | EVOH | — | 0.065 | 0 | — | — | — | — | 2.5 | Dry lamination | — | 30 |

TABLE 1-continued

| | First sealant layer | | | | Second sealant layer | | | | Thickness of adhesive layer [μm] | Production method | Ratio between sealant layers | Total thickness of sealant layers [μm] |
|---|---|---|---|---|---|---|---|---|---|---|---|---|
| | Thickness [μm] | Type | Tg [° C.] | Free volume [nm³] | Thickness [μm] | Type | Density [g/cm³] | MFR [g/10 min] | Melting point [° C.] | | | | |
| Comp. ex. 9 | 30 | Amorphous PET | — | 0.079 | 0 | — | — | — | — | 0.5 | Dry | — | 30 |
| Comp. ex. 10 | 30 | Amorphous PET | — | 0.079 | 0 | — | — | — | — | 2.5 | Dry lamination | — | 30 |

TABLE 2

| | First sealant layer | | | | Second sealant layer | | | | | Thickness of adhesive layer [μm] | Ratio between sealant layers | Total thickness of sealant layers [μm] |
|---|---|---|---|---|---|---|---|---|---|---|---|---|
| | Thickness [μm] | Type | Tg [° C.] | Free volume [nm³] | Thickness [μm] | Type | Density [g/cm³] | MFR [g/10 min] | Melting point [° C.] | | | |
| Ex. 6 | 20 | COC | 78 | 0.092 | 10 | LDPE | 0.918 | 7.0 | 106 | 0.5 | 2:1 | 30 |
| Ex. 7 | 25 | COC | 78 | 0.092 | 5 | LDPE | 0.918 | 7.0 | 106 | 0.5 | 5:1 | 30 |
| Ex. 8 | 10 | COC | 78 | 0.092 | 20 | LDPE | 0.918 | 7.0 | 106 | 0.5 | 1:2 | 30 |
| Ex. 9 | 15 | COC | 78 | 0.092 | 10 | LDPE | 0.918 | 7.0 | 106 | 0.5 | 1.5:1 | 25 |
| Ex. 10 | 10 | COC | 78 | 0.092 | 15 | LDPE | 0.918 | 7.0 | 106 | 0.5 | 1:1.5 | 25 |
| Ex. 11 | 15 | COC | 78 | 0.092 | 15 | LDPE | 0.918 | 7.0 | 106 | 0.5 | 1:1 | 30 |
| Ex. 12 | 20 | COC | 78 | 0.092 | 5 | LDPE | 0.918 | 7.0 | 106 | 0.5 | 4:1 | 25 |
| Ex. 13 | 15 | COC | 78 | 0.092 | 5 | LDPE | 0.918 | 7.0 | 106 | 0.5 | 3:1 | 20 |
| Ex. 14 | 20 | COC | 78 | 0.092 | 30 | LDPE | 0.918 | 7.0 | 106 | 0.5 | 1:1.5 | 50 |
| Ex. 15 | 20 | COC | 78 | 0.092 | 25 | LDPE | 0.918 | 7.0 | 106 | 0.5 | 1:1.25 | 45 |
| Ex. 16 | 20 | COC | 78 | 0.092 | 10 | LDPE | 0.923 | 3.6 | 111 | 0.5 | 2:1 | 30 |
| Ex. 17 | 20 | COC | 78 | 0.092 | 10 | LDPE | 0.919 | 8.0 | 107 | 0.5 | 2:1 | 30 |
| Ex. 18 | 20 | COC | 78 | 0.092 | 10 | LDPE | 0.918 | 8.4 | 106 | 0.5 | 2:1 | 30 |
| Ex. 19 | 20 | COC | 78 | 0.092 | 10 | LDPE | 0.923 | 4.0 | 111 | 0.5 | 2:1 | 30 |
| Ex. 20 | 20 | COC | 78 | 0.092 | 10 | LDPE | 0.922 | 5.0 | 109 | 0.5 | 2:1 | 30 |
| Ex. 21 | 20 | COC | 78 | 0.092 | 10 | LDPE | 0.918 | 10.5 | 107 | 0.5 | 2:1 | 30 |
| Ex. 22 | 20 | COC | 78 | 0.092 | 10 | LDPE | 0.919 | 13.0 | 107 | 0.5 | 2:1 | 30 |
| Comp. ex. 11 | 20 | COC | 78 | 0.092 | 10 | LLDPE | 0.912 | 9.0 | 120 | 0.5 | 2:1 | 30 |
| Comp. Ex. 12 | 20 | COC | 78 | 0.092 | 10 | LLDPE | 0.903 | 3.8 | 98 | 0.5 | 2:1 | 30 |

TABLE 3

| | First sealant layer | | | | Thickness of adhesive layer [μm] | Type of adhesive | Barrier layer | Surface treatment | Adhesion strength [N/15 mm] | Non-adsorbing property (after 1 week) | Contents resistance | Film-forming property |
|---|---|---|---|---|---|---|---|---|---|---|---|---|
| | Thickness [μm] | Type | Tg [° C.] | Free volume [nm³] | | | | | | | | |
| Ex. 23 | 30 | COC | 78 | 0.092 | 0.5 | Anchor coating agent A | Provided | Ozone treatment | 3.0 A | AA | A | A |
| Ex. 24 | 30 | COC | 78 | 0.092 | 0.5 | Anchor coating agent B | Provided | Ozone treatment | 3.0 A | AA | A | A |
| Ex. 25 | 30 | COC | 78 | 0.092 | 0.5 | Anchor coating agent C | Provided | Ozone treatment | 1.0 A | AA | A | A |
| Ex. 26 | 30 | COC | 78 | 0.092 | 0.5 | Anchor coating agent C | Provided | None | 1.0 A | AA | A | A |
| Ex. 27 | 40 | COC | 78 | 0.092 | 0.5 | Anchor coating agent A | Provided | Ozone treatment | 3.5 A | AA | A | A |
| Ex. 28 | 10 | COC | 78 | 0.092 | 0.5 | Anchor coating agent A | Provided | Ozone treatment | 1.5 A | A | A | B |

TABLE 3-continued

| | First sealant layer | | | Thickness of adhesive layer [μm] | Type of adhesive | Barrier layer | Surface treatment | Adhesion strength [N/15 mm] | Non-adsorbing property (after 1 week) | Contents resistance | Film-forming property |
|---|---|---|---|---|---|---|---|---|---|---|---|
| | Thickness [μm] | Type | Tg [° C.] | Free volume [nm³] | | | | | | | |
| Ex. 29 | 40 | COC | 78 | 0.092 | 0.1 | Anchor coating agent A | Provided | Ozone treatment | 1.5 A | AA | A | A |
| Ex. 30 | 30 | COC | 78 | 0.092 | 0.1 | Anchor coating agent A | Provided | Ozone treatment | 1.0 A | AA | A | A |
| Ex. 31 | 10 | COC | 78 | 0.092 | 0.1 | Anchor coating agent A | Provided | Ozone treatment | 0.8 A | A | A | B |
| Ex. 32 | 40 | COC | 78 | 0.092 | 1.0 | Anchor coating agent A | Provided | Ozone treatment | 4.0 A | AA | A | A |
| Ex. 33 | 30 | COC | 78 | 0.092 | 1.0 | Anchor coating agent A | Provided | Ozone treatment | 3.5 A | AA | A | A |
| Ex. 34 | 10 | COC | 78 | 0.092 | 1.0 | Anchor coating agent A | Provided | Ozone treatment | 2.0 A | A | A | B |
| Ex. 35 | 30 | COC | 78 | 0.092 | 0.5 | Anchor coating agent A | Not provided | Ozone treatment | 2.5 A | AA | A | A |

In the column labeled "Production method" in Table 1, "Extrusion lamination" represents that the first sealant layer was formed by extrusion lamination, and "Dry lamination" represents that the first sealant layer was separately formed and then laminated using an adhesive.

Tables 1 and 2 describe, in the columns labeled as "Ratio between sealant layers", a ratio of the thickness of the first sealant layer to the thickness of the second sealant layer.

In the columns labeled "Total thickness of sealant layers", a total of the thickness of the first sealant layer and thickness of the second sealant layer is described.

In the column labeled "Barrier layer" in Table 3, "Provided" represents that the laminate includes a barrier layer, and "Not provided" represents that the laminate does not include a barrier layer.

In the column labeled "Surface treatment", "Ozone treatment" represents that the laminate was subjected to ozone treatment, and "None" represents that no surface treatment was performed.

Evaluation (Adhesion Strength)

For the laminates according to Examples 1 to 4, 23 to 34, and Comparative Examples 1 to 10, the adhesion strength between a barrier layer and the first sealant layer was examined. A test piece having a dimension of 15 mm in width and 10 cm in length was cut out from each of the laminates, and for each of these test pieces, the adhesion strength [N/15 mm] between a barrier layer and the first sealant layer was measured using a method conforming to the peeling method described in JIS K6854-3:1999. Specifically, these test pieces were subjected to peeling at a tensile speed of 300 mm/min.

For the laminates according to Examples 5 to 22 and Comparative Examples 11 and 12, the adhesion strength between a barrier layer and the second sealant layer was examined by the same method as the above-described method.

For the laminate according to Example 35, the adhesion strength between a base material layer and the first sealant layer was examined by the same method as the above-described method.

(Non-Adsorbing Property and Contents Resistance)

Bags having a dimension of 10 cm in length and 10 cm in width were produced from the laminates according to Examples 1 to 5 and Comparative Examples 1 to 10. Next, these bags were filled with methyl salicylate or a skin lotion (tocopherol acetate), and these bags were sealed by heat sealing. Next, the packaged articles thus obtained were left to stand at 40° C. for 30 days, and thereafter it was confirmed whether or not the methyl salicylate or skin lotion (tocopherol acetate) was adsorbed by the first sealant layer of each of the laminates. After the confirmation, as for the laminates of Examples 1 to 4 and Comparative Examples 1 to 10, the adhesion strength between the barrier layer and the first sealant layer was examined by the same method as described in the above section "Adhesion Strength". Furthermore, for the laminate of Example 5, the adhesion strength between the base material layer and the second sealant layer was examined by the same method as described in the above section "Adhesion Strength".

For the laminates according to Examples 6 to 22 and Comparative Examples 11 and 12, bags identical to those described above were produced. These bags were filled with a patch containing 2 mg of tulobuterol, and these bags were sealed by heat sealing. Next, the packaged articles thus obtained were left to stand at 40° C. for one week or six months, and thereafter, it was confirmed whether or not an effective component of the patch was adsorbed by the first sealant layer of each of the laminates. After the confirmation, also for these laminates, the adhesion strength between the barrier layer and the second sealant layer was examined by the same method as the above-described method.

Also for the laminates according to Examples 23 to 35, bags identical to those described above were produced. These bags were filled with the patch and then were sealed by heat sealing. Next, the packaged articles thus obtained were left to stand at 40° C. for one week, and thereafter it was confirmed whether or not an effective component of the patch was adsorbed by the first sealant layer of each of the laminates. After the confirmation, also for these laminates, the adhesion strength between the barrier layer and the first sealant layer was also examined by the same method as the above-described method.

The packaged articles produced from the laminates of Comparative Examples 2, 3, 5, 7, and 9 were found to have low adhesiveness between the adhesive layer and the first sealant layer and were found to be unusable as a bag. Therefore, it was impossible to evaluate non-adsorbing property and contents resistance of the packaged articles obtained from the laminates of Comparative Examples 2, 3, 5, 7, and 9.

The results are summarized in Table 3 above and Tables 4 and 5 below.

TABLE 4

|  | Adhesion strength [N/15 mm] | Non-adsorbing property | | | Contents resistance | |
|---|---|---|---|---|---|---|
|  |  | Methyl salicy-late | Skin lotion (Tocoph-erol acetate) | | Methyl salicy-late | Skin lotion (Tocoph-erol acetate) |
| Ex. 1 | 2.0 | A | AA | AA | A | A |
| Ex. 2 | 1.6 | A | AA | AA | A | A |
| Ex. 3 | 2.3 | A | A | A | A | A |
| Ex. 4 | 2.0 | A | A | A | A | A |
| Ex. 5 | 2.1 | A | AA | AA | A | A |
| Comp. ex. 1 | 2.0 | A | B | B | A | A |
| Comp. ex. 2 | <0.8 | C | — | — | — | — |
| Comp. ex. 3 | <0.8 | C | — | — | — | — |
| Comp. ex. 4 | 3.0 | A | C | C | A | A |
| Comp. ex. 5 | <0.8 | C | — | — | — | — |
| Comp. ex. 6 | 2.0 | A | A | A | A | C |
| Comp. ex. 7 | <0.8 | C | — | — | — | — |
| Comp. ex. 8 | 2.5 | A | A | A | A | C |
| Comp. ex. 9 | <0.8 | C | — | — | — | — |
| Comp. ex. 10 | 2.0 | A | C | A | C | A |

TABLE 5

|  | Adhesion strength [N/15 mm] | Non-adsorbing property | | Contents resistance | | Film-forming property | Tearability |
|---|---|---|---|---|---|---|---|
|  |  | After 1 week | After 6 months | After 1 week | After 6 months | | |
| Ex. 6 | 2.0 A | A | A | A | A | A | A |
| Ex. 7 | 2.0 A | A | AA | A | A | A | A |
| Ex. 8 | 2.0 A | A | B | A | A | A | A |
| Ex. 9 | 2.0 A | A | A | A | A | A | A |
| Ex. 10 | 2.0 A | A | B | A | A | A | A |
| Ex. 11 | 2.0 A | A | A | A | A | A | A |
| Ex. 12 | 2.0 A | A | A | A | A | A | A |
| Ex. 13 | 2.0 A | A | A | A | A | A | A |
| Ex. 14 | 2.0 A | A | A | A | A | A | A |
| Ex. 15 | 2.0 A | A | A | A | A | A | A |
| Ex. 16 | 2.0 A | A | A | A | A | B | A |
| Ex. 17 | 2.0 A | A | A | A | A | A | A |
| Ex. 18 | 2.0 A | A | A | A | A | A | A |
| Ex. 19 | 2.0 A | A | A | A | A | B | A |
| Ex. 20 | 2.0 A | A | A | A | A | A | A |
| Ex. 21 | 2.0 A | A | A | A | A | A | A |
| Ex. 22 | 2.0 A | A | A | A | A | B | A |
| Comp. ex. 11 | <0.1 C | A | A | C | C | C | C |
| Comp. ex. 12 | <0.1 C | A | A | C | C | C | C |

In the column labeled "Adhesion strength [N/15 mm]" in Tables 3, 4, and 5. "A" represents that the adhesion strength was 0.8 N/15 mm or more. "C" represents that the adhesion strength is less than 0.8 N/15 mm.

In the columns labeled "Non-adsorbing property", "AA" represents that the proportion of an effective component of the contents adsorbed by the first sealant layer of the laminate was less than 1% by weight, "A" represents that the proportion of an effective component of the contents adsorbed by the first sealant layer of the laminate was 1% by weight or more and less than 3% by weight, "B" represents that the proportion of an effective component of the contents adsorbed by the first sealant layer of the laminate was 3% by weight or more and less than 5% by weight and the packaged article was of a usable level, and "C" represents that the proportion of an effective component of the contents adsorbed by the first sealant layer of the laminate was 5% by weight or more and the packaged article was of a level making it unsuitable for use.

In the columns labeled "Contents resistance", "A" represents that the adhesion strength of the laminate in the packaged article after storing the contents therein was 0.8 N/15 mm or more. "C" represents that the adhesion strength of the laminate in the packaged article after storing the contents therein was less than 0.8 N/15 mm.

In the columns labeled "Film-forming property", "A" represents that a loss rate caused by an edge weave phenomenon and/or a neck-in phenomenon of a melt film when forming the first sealant layer by the extrusion lamination was less than 10%. "B" represents that a loss rate caused by an edge weave phenomenon and/or a neck-in phenomenon of a melt film when forming the first sealant layer by the extrusion lamination was in the range of 10% or more and less than 20% and the laminate was of a usable level. "C" represents that a loss rate caused by an edge weave phenomenon and/or a neck-in phenomenon of a melt film when forming the first sealant layer by the extrusion lamination was 20% or more and the laminate was of a level making it unsuitable for use.

In the column labeled "Tearability", "A" means that it was possible to tear the packaged article with ease and to tear apart it linearly when torn. "C" represents that it was difficult to tear the packaged article by hand or it was impossible to tear apart linearly when torn.

As shown in Table 3, the packaged articles whose bags were produced from the laminates according to Examples 23 to 35 were of a usable level in which the proportion of an effective component of the contents adsorbed by the first sealant layer of the laminate was less than 3% by weight.

The laminates according to Examples 23 to 35 were excellent in the adhesion strength between the barrier layer and the first sealant layer and caused no delamination.

Also, in the laminates according to Examples 23 to 35, the loss rate caused by an edge weave phenomenon and/or a neck-in phenomenon of the melt film was less than 20%, and thus the laminates were found to be of a usable level.

As shown in Table 4, the packaged articles whose bags were produced from the laminates according to Examples 1 to 5 were of a usable level in which the proportion of an effective component of the contents adsorbed by the first sealant layer of the laminate was less than 3% by weight.

The laminates according to Examples 1 to 5 were excellent in the adhesion strength and caused no delamination. In addition, the laminates according to Examples 1 to 5 were excellent in the contents resistance as well.

As shown in Table 5, after one week from the enclosure of the contents in the bags, the packaged articles whose bags were produced from the laminates according to Examples 6 to 22 were found to be of a usable level where the proportion of an effective component of the contents adsorbed by the first sealant layer of the laminate was less than 3% by weight. After six months from the enclosure of the contents in the bags, these packaged articles were of a usable level where the proportion of an effective component of the contents adsorbed by the first sealant layer of the laminate was less than 5% by weight.

The laminates according to Examples 6 to 22 were excellent in the adhesion strength between the barrier layer and the second sealant layer and caused no delamination.

Also, the laminates according to Examples 6 to 22 were of a usable level in which the loss rate caused by an edge weave phenomenon and/or a neck-in phenomenon of a melt film was less than 20%.

The packaged articles in which the bags were produced from the laminates according to Examples 6 to 22 were able to be torn by hand with ease and able to be torn apart linearly when torn.

In contrast, the packaged articles whose bags were produced from the laminates according to Comparative Examples 1, 4, and 10 were of a level making them unsuitable for use in which the proportion of an effective component of the contents adsorbed by the first sealant layer of the laminate was 5% by weight or more. It is considered that the laminate according to Comparative Example 1 tends to easily adsorb an effective component of the contents, because the adhesive layer thereof was thick. It is considered that the laminate according to Comparative Example 4 is not excellent in non-adsorbing property, because it tends to easily adsorb methyl salicylate and the skin lotion due to the large polymer free volume of the first sealant layer. The first sealant layer of the laminate of Comparative Example 10 was found to have a small polymer free volume. However, the first sealant layer of the laminate according to Comparative Example 10 was found to easily adsorb methyl salicylate, because both the material of the first sealant layer of the laminate and the methyl salicylate, which is the contents thereof, are esters.

The laminates according to Comparative Examples 6 and 8 were not excellent in the contents resistance.

The laminates according to Comparative Examples 2, 3, 5, 7, and 9 had a very weak adhesion strength between the barrier layer and the first sealant layer of less than 0.8 N/15 mm and caused delamination. The laminates according to Comparative Examples 11 and 12 also had a very weak adhesion strength between the barrier layer and the second sealant layer of less than 0.1 N/15 mm and caused delamination. From the matter described above, it is considered that if the thickness of the adhesive in the dry lamination is too thin, it is difficult to achieve high adhesion strength. The materials of the laminates according to Comparative Examples 5, 7, and 9 were all unsuitable for the extrusion lamination.

Also, the laminates according to Comparative Examples 11 and 12 were on of a level unsuitable for use, and the loss rate caused by an edge weave phenomenon and/or a neck-in phenomenon of each of melt films was 20% or more.

The packaged articles in which the bags were produced from the laminates according to Comparative Examples 11 and 12 were difficult to be torn by hand and it was also impossible to tear them apart them linearly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A laminate comprising:
a base material layer;
an adhesive layer provided on the base material layer and having a thickness within a range of 0.1 μm to 1.0 μm;
a first sealant layer provided on the adhesive layer and made of a cyclic polyolefin resin having glass transition temperature of 60° C. to 85° C.; and
a second sealant layer made of a low density polyethylene resin,
wherein one main surface of the first sealant layer constitutes an outermost surface of the laminate,
the other main surface of the first sealant layer is adjacent to the adhesive layer with only the second sealant layer interposed between the first sealant layer and the adhesive layer, and
an adhesion strength between the base material layer and the first sealant layer is 0.8 N/15 mm or more.

2. The laminate according to claim 1, wherein the glass transition temperature of the cyclic polyolefin resin is within a range of 75° C. to 85° C.

3. The laminate according to claim 1, wherein a polymer free volume of the first sealant layer is 0.100 nm$^3$ or less.

4. The laminate according to claim 1, wherein a ratio of a thickness of the second sealant layer to a thickness of the first sealant layer is within a range of 1:2 to 5:1, the low density polyethylene resin has a melt flow rate at 190° C. and a load of 21.168 N within a range of 3.6 g/10 min to 13.0 g/10 min, the low density polyethylene resin has a density within a range of 0.915 g/cm$^3$ to 0.925 g/cm$^3$, each of the second sealant layer and the first sealant layer has a thickness of 5 μm or more, and the thickness of the second sealant layer is 25 μm or less.

5. The laminate according to claim 1, wherein the low density polyethylene resin has a melt flow rate at 190° C. and a load of 21.168 N within a range of 5.0 g/10 min to 10.5 g/10 min.

6. The laminate according to claim 1, wherein a total of a thickness of the second sealant layer and a thickness of the first sealant layer is within a range of 10 μm to 60 μm.

7. The laminate according to claim 1, further comprising a barrier layer interposed between the base material layer and the adhesive layer, wherein the adhesive layer is in contact with the barrier layer.

8. The laminate according to claim 7, wherein the barrier layer includes a layer that includes an aluminum layer or an inorganic oxide thin film.

9. A package comprising the laminate according to claim 1 such that the first sealant layer is adjacent to a space for containing contents.

10. A packaged article comprising:
the package according to claim 9; and
contents contained in the package.

11. A laminate comprising:
a base material layer;
an adhesive layer provided on the base material layer and having a thickness within a range of 0.1 μm to 1.0 μm;
a first sealant layer provided on the adhesive layer and made of a cyclic polyolefin resin having glass transition temperature of 60° C. to 85° C.; and
a barrier layer interposed between the base material layer and the adhesive layer,
wherein the adhesive layer is in contact with the barrier layer,
one main surface of the first sealant layer constitutes an outermost surface of the laminate,
the other main surface of the first sealant layer is in contact with the adhesive layer, or is adjacent to the adhesive layer with only a second sealant layer made of a low density polyethylene resin interposed between the first sealant layer and the adhesive layer, and
an adhesion strength between the base material layer and the first sealant layer is 0.8 N/15 mm or more.

12. The laminate according to claim 11, wherein the glass transition temperature of the cyclic polyolefin resin is within a range of 75° C. to 85° C.

13. The laminate according to claim 11, wherein a polymer free volume of the first sealant layer is 0.100 nm$^3$ or less.

14. The laminate according to claim 11, comprising the second sealant layer.

15. The laminate according to claim 14, wherein a ratio of a thickness of the second sealant layer to a thickness of the first sealant layer is within a range of 1:2 to 5:1, the low density polyethylene resin has a melt flow rate of 190° C. and a load of 21.168 N within a range of 3.6 g/10 min to 13.0 g/10 min, the low density polyethylene resin has a density within a range of 0.915 g/cm$^3$ to 0.925 g/cm$^3$, each of the second sealant layer and the first sealant layer has a thickness of 5 μm or more, and the thickness of the second sealant layer is 25 μm or less.

16. The laminate according to claim 14, wherein the low density polyethylene resin has a melt flow rate at 190° C. and a load of 21.168 N within a range of 5.0 g/10 min to 10.5 g/10 min.

17. The laminate according to claim 14, wherein a total of a thickness of the second sealant layer and a thickness of the first sealant layer is within a range of 10 μm to 60 μm.

18. The laminate according to claim 11, wherein the barrier layer includes a layer that includes an aluminum layer or an inorganic oxide thin film.

19. A package comprising the laminate according to claim 11 such that the first sealant layer is adjacent to a space for containing contents.

20. A packaged article comprising:
the package according to claim 19; and
contents contained in the package.

* * * * *